United States Patent
Asai et al.

(10) Patent No.: US 7,778,611 B2
(45) Date of Patent: Aug. 17, 2010

(54) RADIO COMMUNICATION APPARATUS AND RADIO COMMUNICATION METHOD

(75) Inventors: Takahiro Asai, Yokosuka (JP); Hui Shi, Yokohama (JP); Hitoshi Yoshino, Yokosuka (JP); Satoshi Suyama, Tokyo (JP); Kazuhiko Fukawa, Tokyo (JP); Hiroshi Suzuki, Tokyo (JP)

(73) Assignees: Tokyo Institute of Technology, Tokyo (JP); NTT DoCoMo, Inc., Tokyo (JP)

( * ) Notice: Subject to any disclaimer, the term of this patent is extended or adjusted under 35 U.S.C. 154(b) by 583 days.

(21) Appl. No.: 11/752,714

(22) Filed: May 23, 2007

(65) Prior Publication Data

US 2007/0274372 A1 Nov. 29, 2007

(30) Foreign Application Priority Data

May 29, 2006 (JP) .............................. P2006-148899

(51) Int. Cl.
*H04B 1/50* (2006.01)
*H04B 1/10* (2006.01)

(52) U.S. Cl. ...................................... 455/78
(58) Field of Classification Search ............ 455/296, 455/24, 570, 78, 67.13, 562.1; 375/219, 375/144, 364; 370/278, 248
See application file for complete search history.

(56) References Cited

U.S. PATENT DOCUMENTS

| 5,267,234 A | 11/1993 | Harrison |
| 5,691,978 A | 11/1997 | Kenworthy |

| 2001/0050902 A1* | 12/2001 | Asanuma ................ 370/248 |
| 2002/0045461 A1 | 4/2002 | Bongfeldt |
| 2004/0014449 A1 | 1/2004 | Adachi et al. |

FOREIGN PATENT DOCUMENTS

| JP | 9-312587 | 12/1997 |
| JP | 2001-7750 | 1/2001 |
| JP | 2002-76956 | 3/2002 |
| JP | 2002-158599 | 5/2002 |
| JP | 2002-290278 | 10/2002 |
| JP | 2004-48204 | 2/2004 |

(Continued)

OTHER PUBLICATIONS

Hiroshi Suzuki, et al., "Configuration and Performance of An Open Air Booster for Radio Pager Systems", IEICE General Conference 1996, B-428, Mar. 1996, p. 428 (Document AX listed below is disclosed as an English Translation).

(Continued)

*Primary Examiner*—Matthew D Anderson
*Assistant Examiner*—Gennadiy Tsvey
(74) *Attorney, Agent, or Firm*—Oblon, Spivak, McClelland, Maier & Neustadt, L.L.P.

(57) ABSTRACT

A radio communication apparatus for performing transmission and reception of radio communications simultaneously by using different carrier frequencies for transmission and reception, comprising: a transceiver having a coupling loop interference signal removal function for analog domain and/or a coupling loop interference signal removal function for digital domain, for removing a coupling loop interference signal contained in a signal; and a power suppressor for coupling loop interference signal for attenuating the signal power in order to suppress the coupling loop interference signal power that is contained in the signal.

6 Claims, 24 Drawing Sheets

FOREIGN PATENT DOCUMENTS

| | | |
|---|---|---|
| JP | 2004-194097 | 7/2004 |
| JP | 2005-278122 | 10/2005 |
| WO | WO 2004/095763 A2 | 11/2004 |

OTHER PUBLICATIONS

Hiroshi Suzuki, et al., "A Booster Configuration with Adaptive Reduction of Transmitter-Receiver Antenna Coupling for Pager Systems", Proc. of $50^{th}$ IEEE Vechicular Technology Conference, VTC 1999-Fall, vol. 3, Sep. 1999, pp. 1516-1520.

U.S. Appl. No. 11/694,124, filed Mar. 30, 2007, Asai, et al.

U.S. Appl. No. 11/774,394, filed Jul. 6, 2007, Shirakabe, et al.

* cited by examiner

RADIO COMMUNICATION APPARATUS AND RADIO COMMUNICATION METHOD

BACKGROUND OF THE INVENTION

1. Field of the Invention

The present invention relates to a radio communication apparatus and a radio communication method in which transmission and reception are simultaneously performed using two different carrier frequencies.

2. Related Background Art

In an FDD (Frequency Division Duplex) system in conventional radio communications, transmission and reception are performed simultaneously by using an RF (Radio Frequency) carrier frequency which is different for the uplink (mobile station transmission/base station reception) and the downlink (base station transmission/mobile station reception). In an FDD system, a duplexer is used in cases where transmission and reception are performed by using the same antenna. In cases where a duplexer is operating ideally, all the power of the transmission signal is supplied to the antenna and the signal is transmitted by the antenna. In other words, in the case of a base station, a signal is transmitted by the antenna by using the downlink RF carrier frequency and, in the case of a mobile station, a signal is transmitted by the antenna by using an uplink RF carrier frequency. At the same time, all the power of the signal received by the antenna is supplied to the receiver as a received signal. In other words, in the case of the base station, the signal received by the antenna at the uplink RF carrier frequency is supplied to the receiver and, in the case of the mobile station, the signal received by the antenna is supplied to the receiver at the downlink RF carrier frequency.

However, because an actual antenna cannot be made to operate ideally, there is the possibility that a leak of the power in which a portion of the power of the transmission signal is supplied to the receiver will occur. In other words, in the case of the base station, there is the possibility that a portion of the signal transmitted by the base station using the downlink RF carrier frequency will leak to the receiver of the base station. Further, in the case of the mobile station, there is the possibility that a portion of the signal transmitted by the mobile station using the uplink RF carrier frequency will leak to the receiver of the mobile station.

The interference signal that arises as a result of the leak (called a 'coupling loop interference signal' hereinbelow) is supplied by being superposed on the desired received signal and leaked to the receiver. The possibility therefore exists that the signal quality of the desired received signal will fall. As a radio communication apparatus that reduces the effect of the coupling loop interference signal that arises as a result of the leak, a radio communication apparatus (booster) with a coupling loop interference signal removal function can be utilized. 'Suzuki, Ebine, "Configuration and characteristics of a booster for a radio pager system", IEICE General Conference 1996, B-428, pp. 428, March 1996' and 'H. Suzuki, K. Itoh, Y. Ebine, M. Sato, "A booster configuration with adaptive reduction of transmitter-receiver antenna coupling for pager systems", Proc. of 50th IEEE Vehicular Technology Conference, VTC 1999-Fall, vol. 3, pp. 1516-1520, September 1999' mention a booster for radio pager system that simultaneously performs interference removal in the RF band in the analog domain and interference removal in the baseband in the digital domain.

Further, the radio communication apparatus which performs transmission and reception simultaneously by using two different carrier frequencies requires adequate separation between RF carrier frequency of the transmission signal and RF carrier frequency of the received signal, in order to reduce the effect of the coupling loop interference signal.

In the case of a radio communication system that uses the FDD system, two frequencies, namely the downlink RF carrier frequency and the uplink RF carrier frequency must be secured. However, in order to alleviate the effect of the coupling loop interference signal that arises in the duplexer as mentioned earlier, the uplink RF carrier frequency and downlink RF carrier frequency must be adequately separated.

However, the radio communication apparatus of the above conventional technology was subject to the problem shown below. That is, in the case of the conventional radio communication apparatus of the FDD system, the uplink RF carrier frequency and the downlink RF carrier frequency must be adequately separated and this amounts to a constraint in the allocation of frequencies to the radio communication system that employs the radio communication apparatus. The securing of the uplink RF carrier frequency and the downlink RF carrier frequency which are adequately separated is a major problem in the effective adoption of the current stringent frequency resources.

SUMMARY OF THE INVENTION

The present invention solves the above problem and an object thereof is to provide a radio communication apparatus and radio communication method capable of obviating the need to adequately separate the uplink RF carrier frequency and the downlink RF carrier frequency in an FDD system.

In order to solve the above problem, the radio communication apparatus of the present invention is a radio communication apparatus for performing transmission and reception of radio communications simultaneously by using different carrier frequencies for transmission and reception, comprising: a transceiver having a coupling loop interference signal removal function for analog domain and/or a coupling loop interference signal removal function for digital domain, for removing a coupling loop interference signal contained in a signal; and a power suppressor for coupling loop interference signal for attenuating the signal power in order to suppress the coupling loop interference signal power, wherein the power suppressor for coupling loop interference signal attenuates the signal power prior to the digital domain coupling loop interference signal removal in the transceiver.

In the radio communication apparatus, the transceiver performs a coupling loop interference signal removal for analog domain and/or a coupling loop interference signal removal for digital domain, for removing a coupling loop interference signal contained in the received signal, but the power suppressor for coupling loop interference signal attenuates the signal power of the analog domain signal prior to the digital domain coupling loop interference signal removal in the transceiver.

According to the radio communication apparatus of the present invention, the effect of the coupling loop interference signal that arises in cases where the uplink RF carrier frequency and the downlink RF carrier frequency are adjacent to one another in the FDD system can be alleviated by means of a coupling loop interference signal removal function for analog domain and/or a coupling loop interference signal removal function for digital domain that the transceiver comprises. Further, as a result of the signal power being attenuated in the power suppressor for coupling loop interference signal, the subsequent 'signal saturation effect' can be alleviated. Because the coupling loop interference signal removal characteristic can accordingly be improved, the need to adequately separate the uplink RF carrier frequency and downlink RF carrier frequency in the FDD system can be obviated.

'The effect of signal saturation' means that, for the received RF signal processor or A/D converter or the like, for example, there are restrictions on the input signal power with which the respective processors can operate correctly and, in cases where a signal whose power exceeds the safe input signal power, the signal saturates the processor and, therefore, the received RF signal processor and A/D converter or the like can no longer operate correctly. When such signal saturation effect occurs, a situation where the output signal waveform is greatly distorted in the received RF signal processor and the analog signal can no longer be accurately converted to a digital signal by the A/D converter arises. According to the radio communication apparatus of the present invention, the effect of such signal saturation can be alleviated.

Further, in the case of the radio communication apparatus of the present invention, the transceiver comprises a transmission RF signal processor, a received RF signal processor, and a baseband signal processor, and the radio communication apparatus further comprises: a controller for power suppression for controlling at least one of magnitude of the signal power attenuated by the power suppressor for coupling loop interference signal, magnitude of the output power of the transmission RF signal processor, magnitude of the output power of the received RF signal processor, and magnitude of the output of the baseband signal processor, and the controller for power suppression is desirably configured to perform the control in response to at least one of the magnitude of the output power of the transmission RF signal processor, the magnitude of the output power of the received RF signal processor, and the magnitude of the output of the baseband signal processor. As a result of this structure, because control of the magnitude of the output power corresponding with a permissible power that varies for each analog domain signal processor (transmission RF signal processor and received RF signal processor) is possible, the effect of signal saturation can be further alleviated. Because the coupling loop interference signal removal characteristic can accordingly be improved, it is possible to implement an FDD system not requiring adequate separation of the uplink RF carrier frequency and downlink RF carrier frequency.

Further, the radio communication apparatus of the present invention is desirably configured separately comprising a transmission antenna and a reception antenna. As a result, because a duplexer need no longer to be used, the effect of the coupling loop interference signal power in cases where the uplink RF carrier frequency and the downlink RF carrier frequency are adjacent to one another can be alleviated. However, so in cases where different antennas are used for the uplink and downlink, in instances where the uplink RF carrier frequency and downlink RF carrier frequency are adjacent to one another, a coupling loop interference signal is produced as a result of the signal transmitted by the transmission antenna being subjected to the effects of the peripheral transmission environment such as reflection and diffraction and being received by the reception antenna of the same radio communication apparatus. However, the radio communication apparatus of the present invention is able to reduce the effect of the coupling loop interference signal as a result of the action of the transceiver and power suppressor for coupling loop interference signal on the coupling loop interference signal. As a result, in the case of a radio communication apparatus that separately comprises a transmission antenna and a reception antenna, it is possible to implement an FDD system not requiring adequate separation of the uplink RF carrier frequency and downlink RF carrier frequency.

Further, in the case of the radio communication apparatus of the present invention, the transceiver separately comprises an uplink signal processor that performs predetermined processing on an uplink signal and a downlink signal processor that performs predetermined processing on a downlink signal, the radio communication apparatus separately comprises an antenna for communication with base stations and an antenna for communication with mobile stations, and the radio communication apparatus is desirably configured to perform predetermined processing, by means of the downlink signal processor, on the signal from the base station received by the antenna for communication with base stations and to transmit the processed signal from the antenna for communication with mobile stations, and radio communication apparatus is desirably configured to perform predetermined processing, by means of the uplink signal processor, on the signal from the mobile station received by the antenna for communication with mobile stations and to transmit the processed signal from the antenna for communication with base stations. Accordingly, the radio communication apparatus can be used as a booster of an FDD system and the effect of signal saturation that arises in the coupling loop interference signal can be alleviated. As a result, a booster of an FDD system not requiring adequate separation of an uplink RF carrier frequency and a downlink RF carrier frequency can be implemented.

Further, the radio communication apparatus of the present invention separately comprises an uplink analog signal processor that performs predetermined processing on a signal of the uplink analog domain; a downlink analog signal processor that performs predetermined processing on a signal of the downlink analog domain; an uplink digital signal processor that performs predetermined processing on the signal of the uplink digital domain; and a downlink digital signal processor that performs predetermined processing on the signal of the downlink digital domain, and wherein the radio communication apparatus is configured to use a predetermined uplink carrier frequency to perform transmission and reception simultaneously by means of the uplink digital signal processor and the uplink analog signal processor, and is configured to use a predetermined downlink carrier frequency to perform transmission and reception simultaneously by means of the downlink digital signal processor and the downlink analog signal processor. Accordingly, because simultaneous transmission and reception are possible at a predetermined uplink carrier frequency and at a predetermined downlink carrier frequency respectively, the frequency utilization efficiency can be improved and the effect of the coupling loop interference signal which is a problem for the radio communication apparatus can be alleviated by means of the transceiver and the power suppressor for coupling loop interference signal. As a result, in the case of a radio communication apparatus that performs transmission and reception simultaneously at the uplink RF carrier frequency and at the downlink RF carrier frequency respectively, a radio communication apparatus not requiring adequate separation of the uplink RF carrier frequency and downlink RF carrier frequency can be implemented.

Furthermore, in the case of the radio communication apparatus of the present invention, the uplink analog signal processor comprises a first fluctuation determiner for received signal power for determining received power fluctuation speed by using the output signal after uplink analog domain interference removal, and the uplink digital signal processor comprises: a first power determiner for residual interference signal for determining a ratio of the residual interference signal power in the output signal power after uplink digital domain interference removal; and a first transmission propriety/impropriety decider for determining whether to perform simultaneous transmission and reception of signals at a predetermined uplink carrier frequency, on the basis of at least one of whether the received power fluctuation speed determined by the first fluctuation determiner for received signal power is equal to or more than a predetermined reference value and whether the ratio of the residual interference signal power determined by the first power determiner for residual interference signal is equal to or more than a predetermined reference ratio, and wherein the downlink analog signal processor comprises a second fluctuation determiner for received signal power for determining received power fluctuation speed by using the output signal after the downlink analog domain interference removal, and the downlink digital signal processor comprises: a second power determiner for residual interference signal for determining a ratio of the residual interference signal power in the output signal power after downlink digital domain interference removal; and a second transmission propriety/impropriety decider for determining whether to perform simultaneous transmission and reception of signals at a predetermined downlink carrier frequency, on the basis of at least one of whether the received power fluctuation speed determined by the second fluctuation determiner for received signal power is equal to or more than a predetermined reference value and whether the ratio of the residual interference signal power determined by the second power determiner for residual interference signal is equal to or more than a predetermined reference ratio, and wherein the radio communication apparatus is configured to control the simultaneous transmission and reception of signals at a predetermined uplink carrier frequency on the basis of the determination by the first transmission propriety/impropriety decider, and is configured to control the simultaneous transmission and reception of signals at a predetermined downlink carrier frequency on the basis of the determination by the second transmission propriety/impropriety decider.

As a result of this structure, the permission/non-permission of signal transmission can be determined on the basis of the received power fluctuation speed and the ratio of the residual interference signal power, for both an uplink and a downlink. Hence, by not permitting simultaneous transmission and reception in a state where the effect of signal saturation is large and an adequate interference removal characteristic is not obtained, deterioration of the signal detection performance of the desired signal can be prevented. As a result, in the case of a radio communication apparatus that performs transmission and reception simultaneously at the uplink RF carrier frequency and downlink RF carrier frequency, deterioration of the coupling loop interference signal removal characteristic can be prevented by suitably determining whether simultaneous transmission and reception are performed or not performed in accordance with the state, whereby a radio communication apparatus not requiring adequate separation of the uplink RF carrier frequency and downlink RF carrier frequency can be implemented.

In order to solve the above problem, the radio communication method of the present invention is a radio communication method for a radio communication apparatus for performing transmission and reception of radio communications simultaneously by using different carrier frequencies for transmission and reception, comprising: a removing step of performing a coupling loop interference signal removal processing for analog domain and/or a coupling loop interference signal removal processing for digital domain, to remove a coupling loop interference signal contained in a signal; and a power suppression step of attenuating signal power to suppress coupling loop interference signal power, wherein in the power suppression step, the signal power is attenuated prior to the coupling loop interference signal removal processing for digital domain in the removing step. Accordingly, because the effect of the coupling loop interference signal can be reduced, an FDD system not requiring adequate separation of the uplink RF carrier frequency and downlink RF carrier frequency can be implemented.

Furthermore, the radio communication method of the present invention further comprises a control step of performing control on at least one of magnitude of the signal power attenuated in the power suppression step, magnitude of the output power by transmission RF signal processing in the removing step, magnitude of the output power by received RF signal processing in the removing step, and magnitude of the output by baseband signal processing in the removing step, and wherein the control is performed in the control step in response to at least one of the magnitude of the output power by the transmission RF signal processing, the magnitude of the output power by the received RF signal processing, and the magnitude of the output by the baseband signal processing. Because this method permits control of the signal power that corresponds with permissible power that differs for each analog domain signal processor (a processor for performing transmission RF signal processing and a processor for performing received RF signal processing), the effect of signal saturation can be further alleviated. Accordingly, because the effect of the coupling loop interference signal can be reduced further, the FDD system not requiring adequate separation of the uplink RF carrier frequency and downlink RF carrier frequency can be implemented.

Furthermore, the radio communication method of the present invention separately comprises: an uplink analog signal processing step of performing predetermined processing on a signal of the uplink analog domain; a downlink analog signal processing step of performing predetermined processing on a signal of the downlink analog domain; an uplink digital signal processing step of performing predetermined processing on the signal of the uplink digital domain; and a downlink digital signal processing step of performing predetermined processing on the signal of the downlink digital domain, and wherein the radio communication apparatus uses a predetermined uplink carrier frequency to perform transmission and reception simultaneously in the uplink digital signal processing step and the uplink analog signal processing step, and the radio communication apparatus uses a predetermined downlink carrier frequency to perform transmission and reception simultaneously in the downlink digital signal processing step and the downlink analog signal processing step. As a result of this method, the frequency utilization efficiency can be improved because transmission and reception are possible at the uplink RF carrier frequency and at the downlink RF carrier frequency respectively, and the effect of the coupling loop interference signal can be alleviated by the analog domain and/or digital domain removing step and power suppression step. Accordingly, radio communication not requiring adequate separation of the uplink RF carrier frequency and downlink RF carrier frequency are possible with a radio communication method that performs transmission and reception at the uplink RF carrier frequency and downlink RF carrier frequency respectively.

Furthermore, the radio communication method of the present invention is a radio communication method, wherein, in the uplink analog signal processing step, the radio communication apparatus determines received power fluctuation speed by using the output signal after uplink analog domain interference removal; in the uplink digital signal processing step, the radio communication apparatus determines a ratio of the residual interference signal power in the output signal power after uplink digital domain interference removal, and determines whether to perform simultaneous transmission and reception of signals at a predetermined uplink carrier frequency, on the basis of at least one of whether the received power fluctuation speed is equal to or more than a predetermined reference value and whether the ratio of the residual interference signal power is equal to or more than a predetermined reference ratio; in the downlink analog signal processing step, the radio communication apparatus determines received power fluctuation speed by using the output signal after downlink analog domain interference removal; in the downlink digital signal processing step, the radio communication apparatus determines a ratio of the residual interference signal power in the output signal power after downlink digital domain interference removal, and determines whether to perform simultaneous transmission and reception of signals at a predetermined downlink carrier frequency, on the basis of at least one of whether the received power fluctuation speed is equal to or more than a predetermined reference value and whether the ratio of the residual interference signal power is equal to or more than a predetermined reference ratio; and wherein the radio communication apparatus controls the simultaneous transmission and reception of signals at a predetermined uplink carrier frequency on the basis of the determination in the uplink digital signal processing step, and controls the simultaneous transmission and reception of signals at a predetermined downlink carrier frequency on the basis of the determination in the downlink digital signal processing step. As a result of this method, the permission/non-permission of signal transmission can be determined on the basis of the received power fluctuation speed and the ratio of the residual interference signal power, for both an uplink and a downlink. Hence, by not permitting simultaneous transmission and reception in a state where the effect of signal saturation is large and an adequate interference removal characteristic is not obtained, deterioration of the signal detection performance of the desired signal can be prevented. As a result, in the case of a radio communication apparatus that performs transmission and reception simultaneously at the uplink RF carrier frequency and downlink RF carrier frequency, deterioration of the coupling loop interference signal removal characteristic can be prevented by suitably determining whether simultaneous transmission and reception are performed or not performed in accordance with the state, whereby a radio communication apparatus not requiring adequate separation of the uplink RF carrier frequency and downlink RF carrier frequency can be implemented.

According to the radio communication apparatus or the radio communication method of the present invention, the effect of the coupling loop interference signal can be alleviated and, by attenuating the signal power, the effect of signal saturation in the received RF signal processor and A/D (Analog to Digital) converter or the like can be reduced. As a result, because the coupling loop interference signal removal characteristic can be improved, the need to adequately separate the uplink RF carrier frequency and downlink RF carrier frequency in the FDD system can be obviated.

DESCRIPTION OF THE PREFERRED EMBODIMENTS

Figure 1:
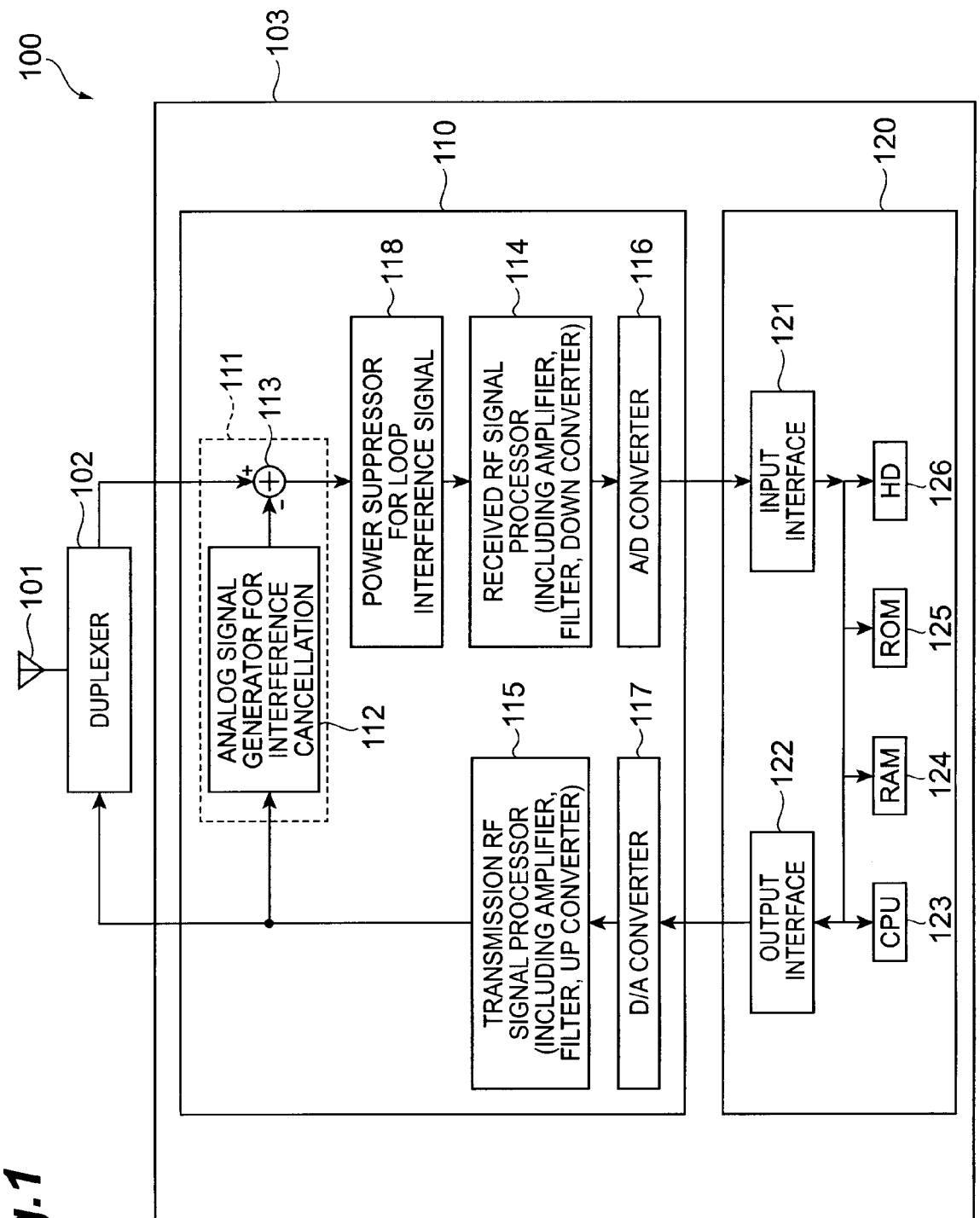
FIG. 1 is a hardware block diagram of a radio communication apparatus according to a first embodiment.

Radio communication devices of embodiments of the present invention will be described with reference to the drawings. Where possible, the same reference numerals have been assigned to the same parts to avoid repetition in the description.

First Embodiment

The structure of the radio communication apparatus according to the first embodiment of the present invention will be described first. FIG. 1 is a hardware structural view of the radio communication apparatus. As shown in FIG. 1, the radio communication apparatus 100 is physically configured by an antenna 101, a duplexer 102, and a transceiver 103 with a coupling loop interference removal function. Here, the transceiver 103 is configured by an analog signal processor 110 and a digital signal processor 120 and the analog signal processor 110 is configured by an analog domain interference canceller 111, a received RF signal processor 114, a transmission RF signal processor 115, an A/D converter 116, a D/A converter 117, and a power suppressor for coupling loop interference signal 118. In cases where a direct-conversion-type A/D converter that performs direct digital signal conversion from an RF signal is employed as the A/D converter 116, the received RF signal processor 114 can be omitted.

In cases where this radio communication apparatus is used as the base station, the received RF signal processor 114 subjects the signal received at the uplink RF carrier frequency to amplification using an amplifier, band-limiting using a filter, conversion to the baseband signal using a downconverter, and, in order to perform signal transmission by means of the downlink RF carrier signal, the transmission RF signal processor 115 subjects the baseband analog signal output by the D/A converter 117 to amplification using an amplifier, band-limiting using a filter, and frequency conversion to the downlink RF carrier frequency using an upconverter.

Furthermore, when this radio communication apparatus is used as a mobile station, the received RF signal processor 114 subjects the signal received at the downlink RF carrier frequency to amplification using an amplifier, band-limiting using a filter, and conversion to the baseband signal using a downconverter, and, in order to perform signal transmission by means of the uplink RF carrier signal, the transmission RF signal processor 115 subjects the baseband analog signal output by the D/A converter 117 to amplification using an amplifier, band-limiting using a filter, and frequency conversion to the uplink RF carrier frequency using an upconverter.

The analog domain interference canceller 111 is configured by an analog signal generator for interference cancellation 112 and an analog domain interference signal remover 113. The analog signal generator for interference cancellation 112 uses the output signal from the transmission RF signal processor 115 to generate an analog signal used for interference removal. The analog domain interference signal remover 113 performs coupling loop interference signal removal in the analog domain by removing the signal that is input from the analog signal generator for interference cancellation 112 from the signal that is input from the duplexer 102.

Meanwhile, the digital signal processor 120 is configured by an input interface 121, an output interface 122, a CPU 123, a RAM 124 and ROM 125 which constitute the main storage device, and an auxiliary storage device 126 such as a hard disk.

In this structure, the power suppressor for coupling loop interference signal 118 attenuates signal power in order to suppress the power of the coupling loop interference signal still contained in the output signal of the analog domain interference canceller 111. As a result, in order to alleviate the effect of signal saturation in the subsequent received RF signal processor 114 and/or the A/D converter 116, distortion of the signal waveform produced in the received RF signal processor 114 and errors during digital signal conversion that are produced in the A/D converter 116 can be reduced. As a result, because the effect of the coupling loop interference signal can be reduced, an FDD system not requiring adequate separation of the uplink RF carrier frequency and the downlink RF carrier frequency can be implemented.

Figure 2:
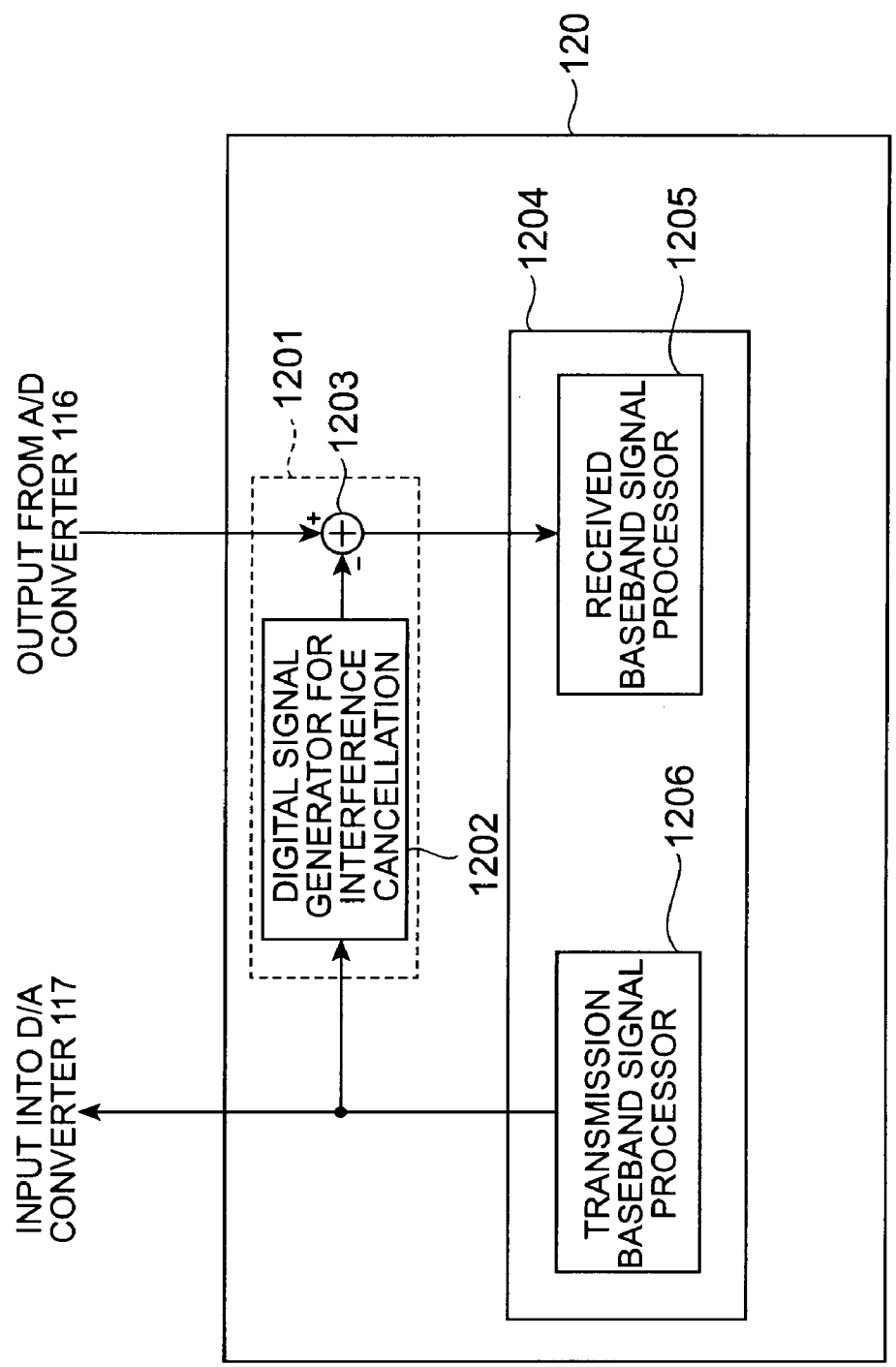
FIG. 2 is a functional block diagram of a digital signal processor according to the first embodiment.

FIG. 2 shows a functional block diagram of the digital signal processor 120 of this embodiment. The digital signal processor 120 comprises a digital domain interference canceller 1201 and a baseband signal processor 1204; the digital domain interference canceller 1201 comprises a digital signal generator for interference cancellation 1202 and a digital domain interference signal remover 1203; the baseband signal processor 1204 comprises a received baseband signal processor 1205 and a transmission baseband signal processor 1206. The interference canceller 1201 removes the coupling loop interference signal component that is still contained in the signal that has been converted to a digital signal via the A/D converter 116. Thereupon, the digital canceller 1201 removes the coupling loop interference signal component by using the signal generated in the digital signal generator for interference cancellation 1202 based on the output signal of the transmission baseband signal processor 1206. Here, although the coupling loop interference signal removal characteristic differs greatly as a result of the effect of signal saturation in the analog signal processor 110, the digital domain coupling loop interference signal removal characteristic can be improved as a result of the signal power being attenuated in the power suppressor for coupling loop interference signal 118.

Figure 3:
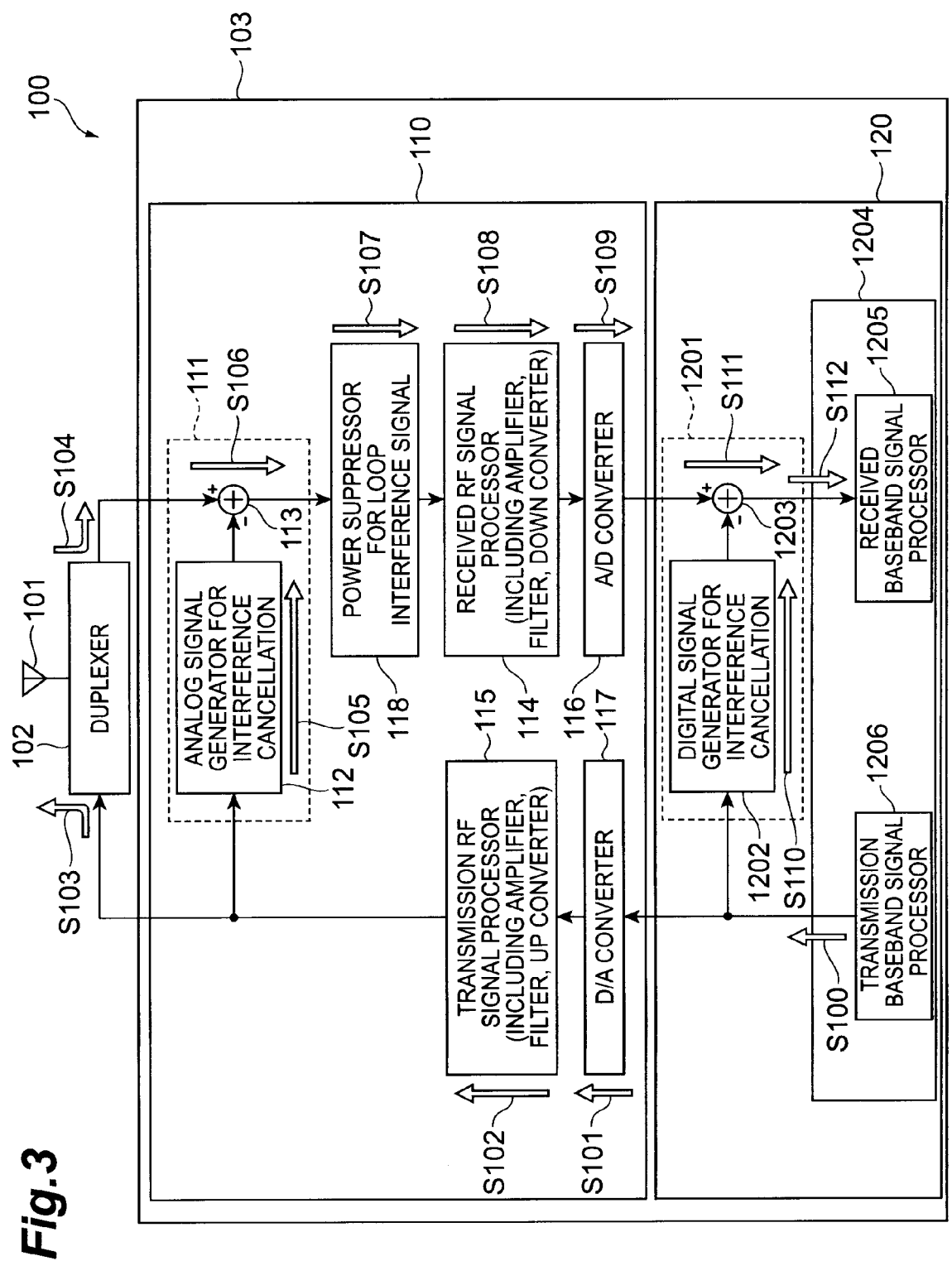
FIG. 3 is a block diagram of a procedure for a radio communication apparatus according to the first embodiment.

Thereafter, the operation of the radio communication apparatus of this embodiment will be described together with the radio communication method of the embodiment of the present invention. FIG. 3 shows the procedure for performing transmission and reception for the radio communication apparatus according to this embodiment.

According to the radio communication method of this embodiment, the transmission baseband signal processor 1206 produces a signal for transmission in step S100. The output of the transmission baseband signal processor is input to the digital signal generator for interference cancellation 1202 and input to the D/A converter 117. The signal that is input to the D/A converter 117 is converted into an analog signal in step S101 and input to the transmission RF signal processor 115. Thereafter, in step S102, the signal that has undergone amplification using an amplifier, band-limiting using a filter, and conversion to an RF-band analog signal as a result of frequency conversion using an upconverter in the transmission RF signal processor is input to the analog signal generator for interference cancellation 112 and input to the duplexer 102.

The signal that has been input to the duplexer 102 is transmitted via the antenna 101 in step S103. On the other hand, the desired signal that has been transmitted to this radio communication apparatus by another radio communication apparatus is received by the antenna 101 and, after being input to the duplexer 102 as a result of step S104, is input to the analog signal processor 110. Here, as a result of the imperfections of the duplexer, part of the signal input to the duplexer in step S103 as a transmission signal ends up being supplied to the analog signal processor 110 as a coupling loop interference signal. As a result, a signal that is produced by adding the coupling loop interference signal to the desired signal transmitted by the other radio communication apparatus to this radio communication apparatus is input to the analog signal processor 110.

Thereafter, the analog domain interference signal remover 113 removes the coupling loop interference signal in step S106 by using the signal generated by the analog signal generator for interference cancellation 112 in step S105. Here, the analog signal generator for interference cancellation 112 generates an interference-removal analog signal by using the output signal of the transmission RF signal processor 115 generated in step S102. Thereafter, in order to reduce the effects of signal saturation that arises from a coupling loop interference signal in the subsequent received RF signal processor 114 and/or A/D converter 116, the power suppressor for coupling loop interference signal 118 attenuates the power of the signal input to the power suppressor for coupling loop interference signal 118 in step S107. The output signal of the power suppressor for coupling loop interference signal 118 is input to the received RF signal processor 114 and the received RF signal processor 114 performs signal amplification using an amplifier in step S108, band-limiting using a filter, and frequency conversion using a downconverter. Thereafter, the processed signal is input to the A/D converter 116 and, in step S109, the signal converted into a digital signal by the A/D converter 116 is input to the digital domain interference signal remover 1203.

Thereupon, the digital signal generator for interference cancellation 1202 uses the signal generated by the transmission baseband signal processor 1206 in step S100 to produce a signal used for interference removal in the digital domain. Further, the digital domain interference signal remover 1203 uses a signal that is generated by the digital signal generator for interference cancellation 1202 in step S110 to perform interference removal in step S111. The signal subjected to interference signal removal is input to the received baseband signal processor in step S112 and detection of the desired signal is carried out.

As mentioned earlier, by attenuating the signal power in step S107, the effects of signal saturation that arises in the coupling loop interference signal in the received RF signal processing in step S108 and in the A/D conversion in step S109 can be alleviated and the coupling loop interference signal removal characteristic in the digital domain in step S111 can be improved. As a result, because the effect of the coupling loop interference signal that arises when the uplink RF carrier frequency and downlink RF carrier frequency are adjacent to one another can be alleviated, an FDD system not requiring adequate separation of the uplink RF carrier frequency and the downlink RF carrier frequency can be implemented.

The action and effect of the radio communication apparatus 100 of this embodiment will be described next. In the radio communication apparatus of this embodiment, as a result of the power suppressor for coupling loop interference signal 118 attenuating the signal power, the effect of signal saturation that arises in the coupling loop interference signal at the received RF signal processor 114 and A/D converter 116 can be alleviated and the coupling loop interference signal removal characteristic of the digital domain interference canceller 1201 can be improved. As a result, because the effect of the coupling loop interference signal can be adequately reduced, an FDD system not requiring adequate separation of the uplink RF carrier frequency and the downlink RF carrier frequency can be implemented.

Figure 4:
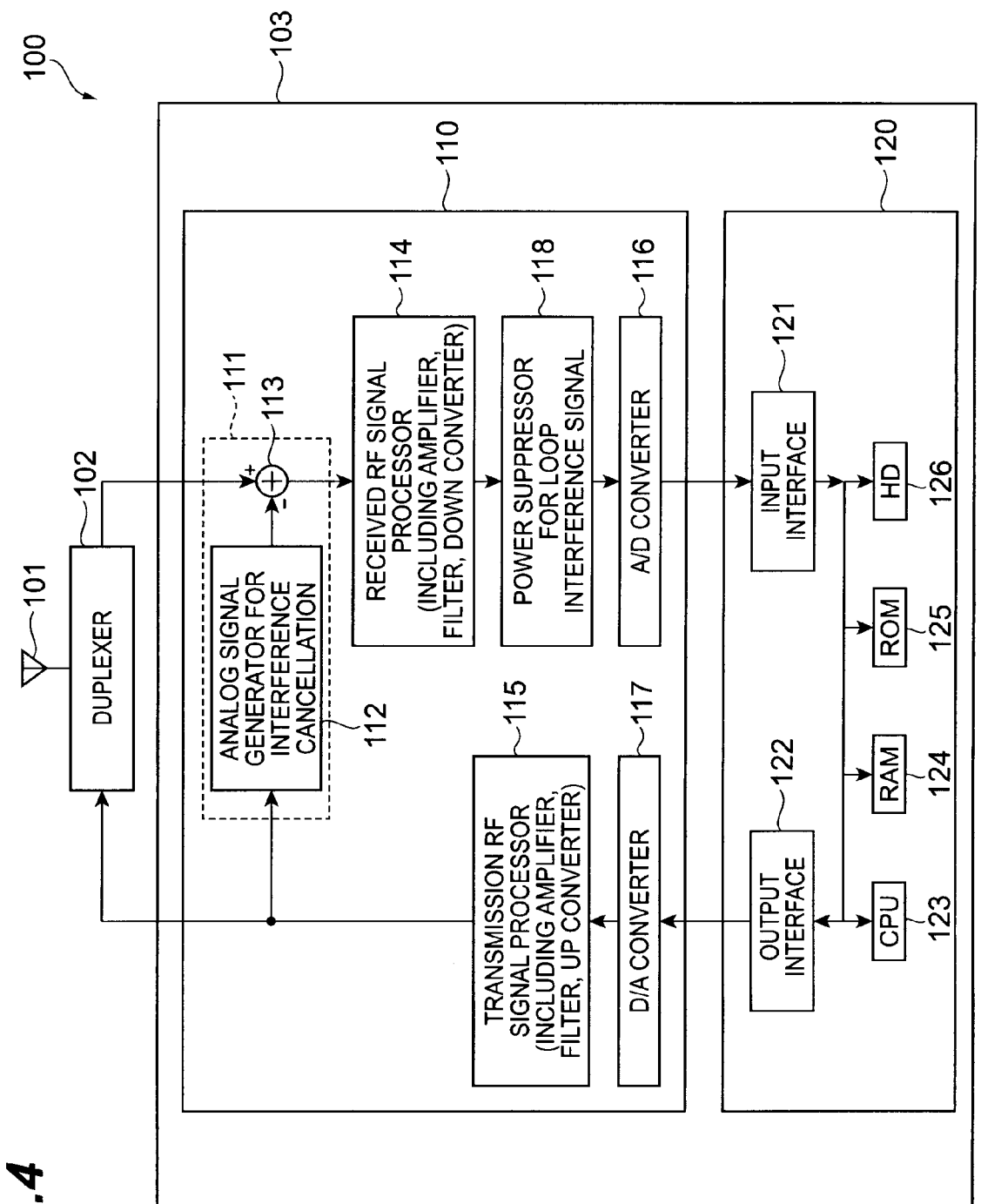
FIG. 4 is a first modified example of the hardware block diagram of the radio communication apparatus according to the first embodiment.

Although a structure in which the power suppressor for coupling loop interference signal 118 is provided between the analog domain interference canceller 111 and received RF signal processor 114 as shown in FIG. 1 was described in the above example of the radio communication apparatus, a structure in which the power suppressor for coupling loop interference signal 118 is provided between the received RF signal processor 114 and the A/D converter 116 is also possible as per the first modified example of the hardware block diagram shown in FIG. 4. In this case, the power suppressor for coupling loop interference signal 118 is able to alleviate the effect of signal saturation that arises in the coupling loop interference signal in the subsequent A/D converter 116 by attenuating the output signal of the received RF signal processor 114.

Figure 5:
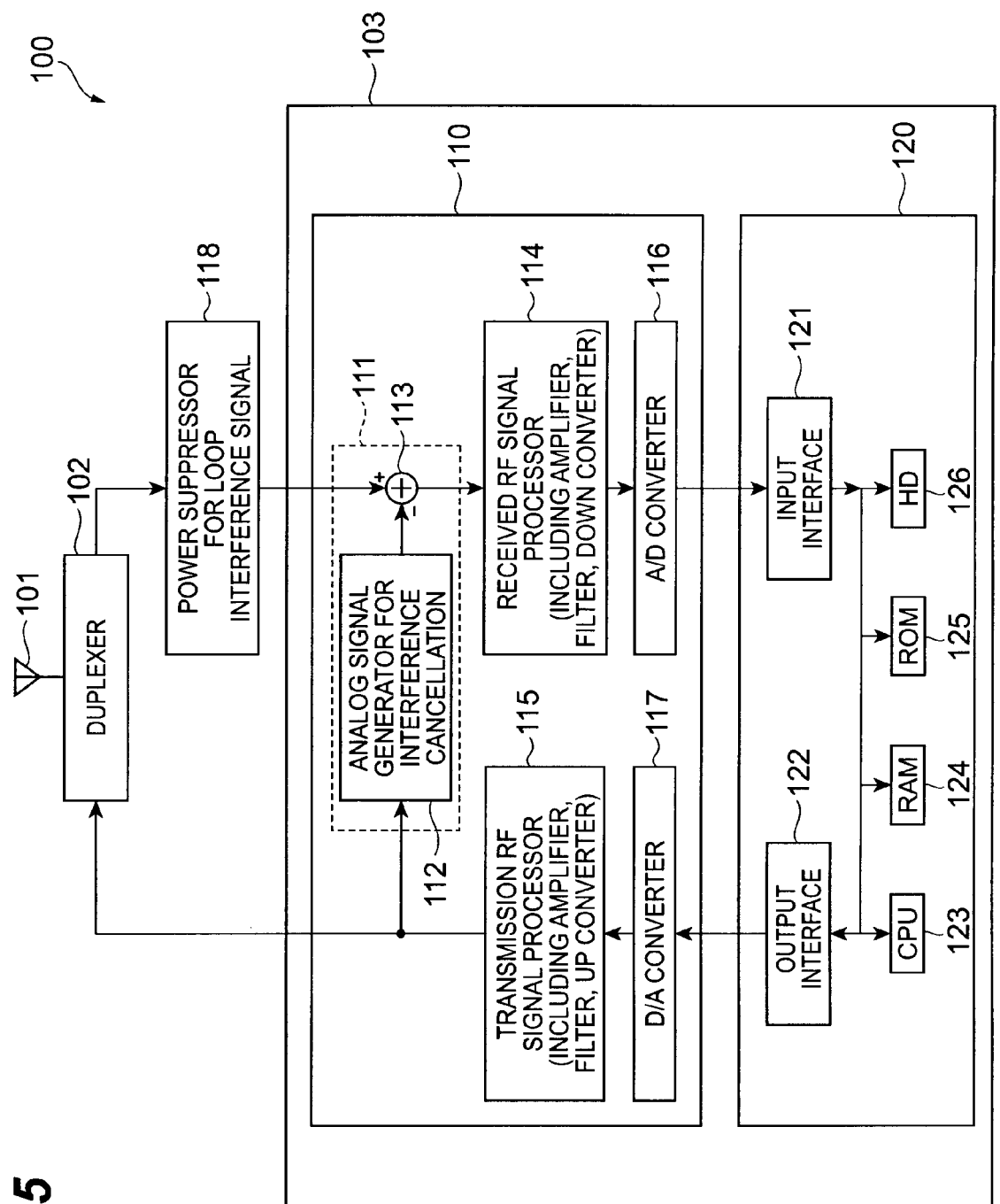
FIG. 5 shows a second modified example of the hardware block diagram of the radio communication apparatus according to the first embodiment.

Further, as per the second modified example of the hardware block diagram in FIG. 5, a structure in which the power suppressor for coupling loop interference signal 118 is provided between the duplexer 102 and analog domain interference canceller 111 is also possible. So, in this case, the power suppressor for coupling loop interference signal 118 is able to alleviate the effect of signal saturation to which the subsequent analog domain interference canceller 111, received RF signal processor 114, and A/D converter 116 are subjected by attenuating the signal power. Likewise, the structure may be such that the power suppressor for coupling loop interference signal 118 is provided in any location within the received RF signal processor 114. As mentioned earlier, in the case of this radio communication apparatus, the effect of signal saturation that arises in the coupling loop interference signal can be alleviated as a result of the power suppressor for coupling loop interference signal 118 being provided in any location between the duplexer 102 and A/D converter 116 or by means of a combination thereof.

Figure 6:
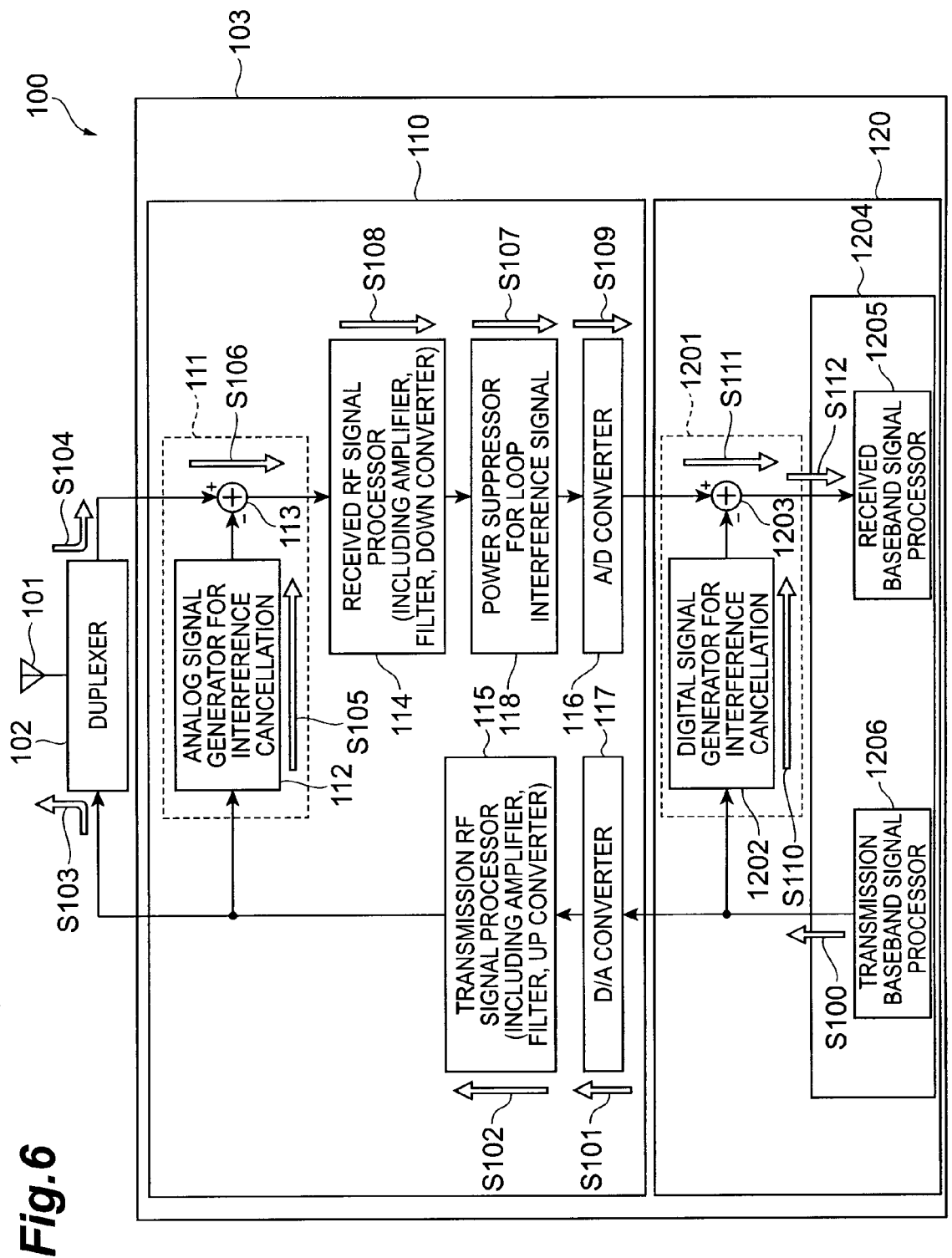
FIG. 6 shows a first modified example of the block diagram of a procedure of the radio communication apparatus according to the first embodiment.

Likewise, in the case of the above radio communication method, although a method that involves performing loop signal power suppression in step S107 between step S106 which performs analog domain interference removal and step S108 which performs received RF signal processing as shown in FIG. 3 was described, it is also possible to perform the signal power attenuation of step S107 with respect to the signal on which the received RF signal processing was performed in step S108 as shown in FIG. 6. As a result, the effect of signal saturation in step S109 can be alleviated.

Figure 7:
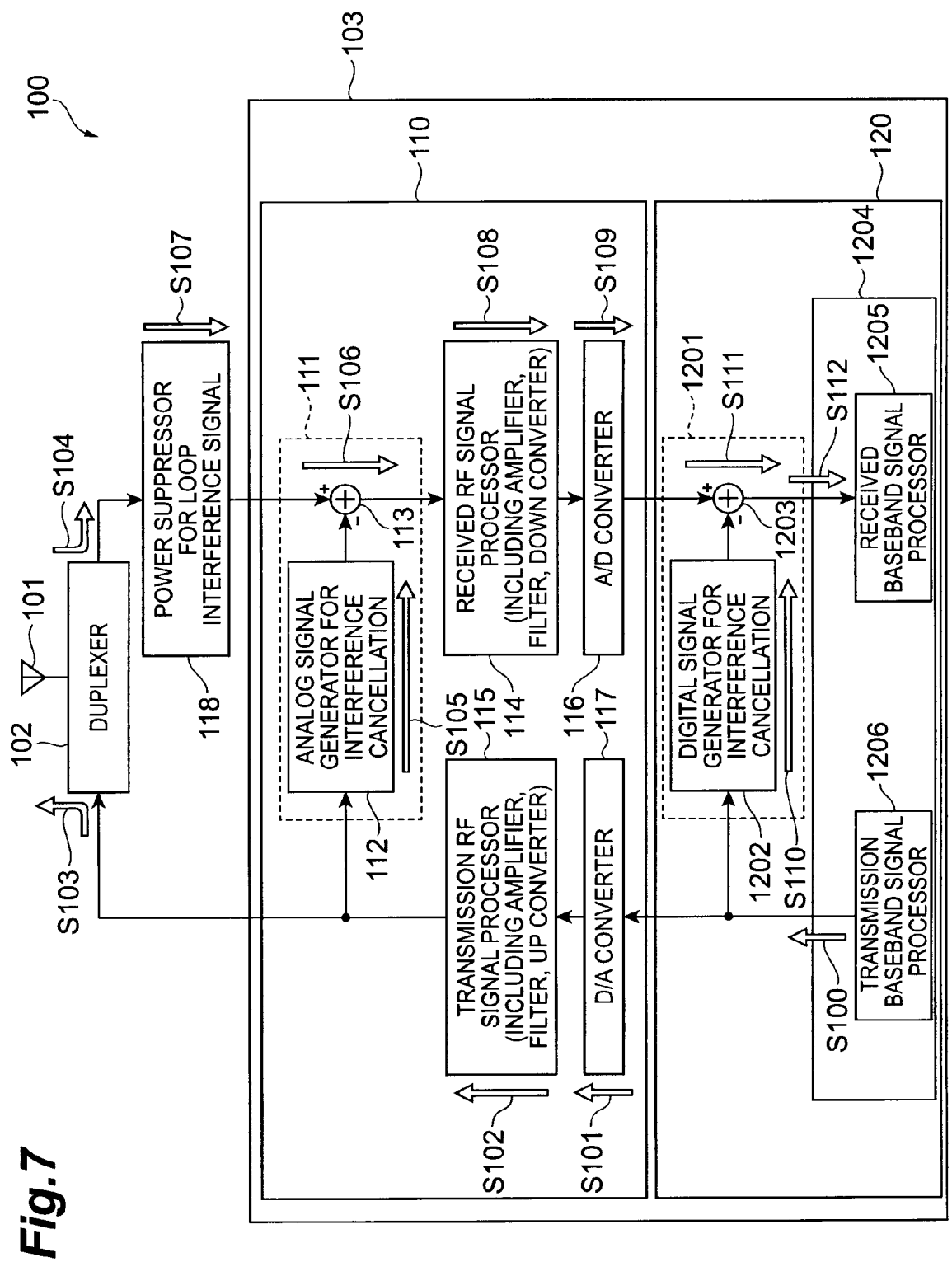
FIG. 7 shows a second modified example of the block diagram of a procedure of the radio communication apparatus according to the first embodiment.

Furthermore, as shown in FIG. 7, the signal power attenuation of step S107 may also be performed on the signal obtained in step S104. As a result, the effect of signal saturation that arises in the coupling loop interference signal in steps S106, S108, and S109 can be alleviated. Likewise, the attenuation of the signal power of step S107 may be performed at any stage in the received RF signal processing step in step S108.

As described hereinabove, in this radio communication method, the attenuation of the signal power of step S107 can be performed between step S104 and step S109 or be applied in combination to alleviate the effect of signal saturation that arises in the coupling loop interference signal. As a result, because the effect of the coupling loop interference signal can be reduced, a radio communication method of an FDD system not requiring adequate separation of the uplink RF carrier frequency and the downlink RF carrier frequency can be implemented.

The above structure of the radio communication apparatus and radio communication method are shown for a case where the number of antennas is one but can be easily expanded also to cases where communication using a plurality of antennas is performed.

Second Embodiment

Figure 8:
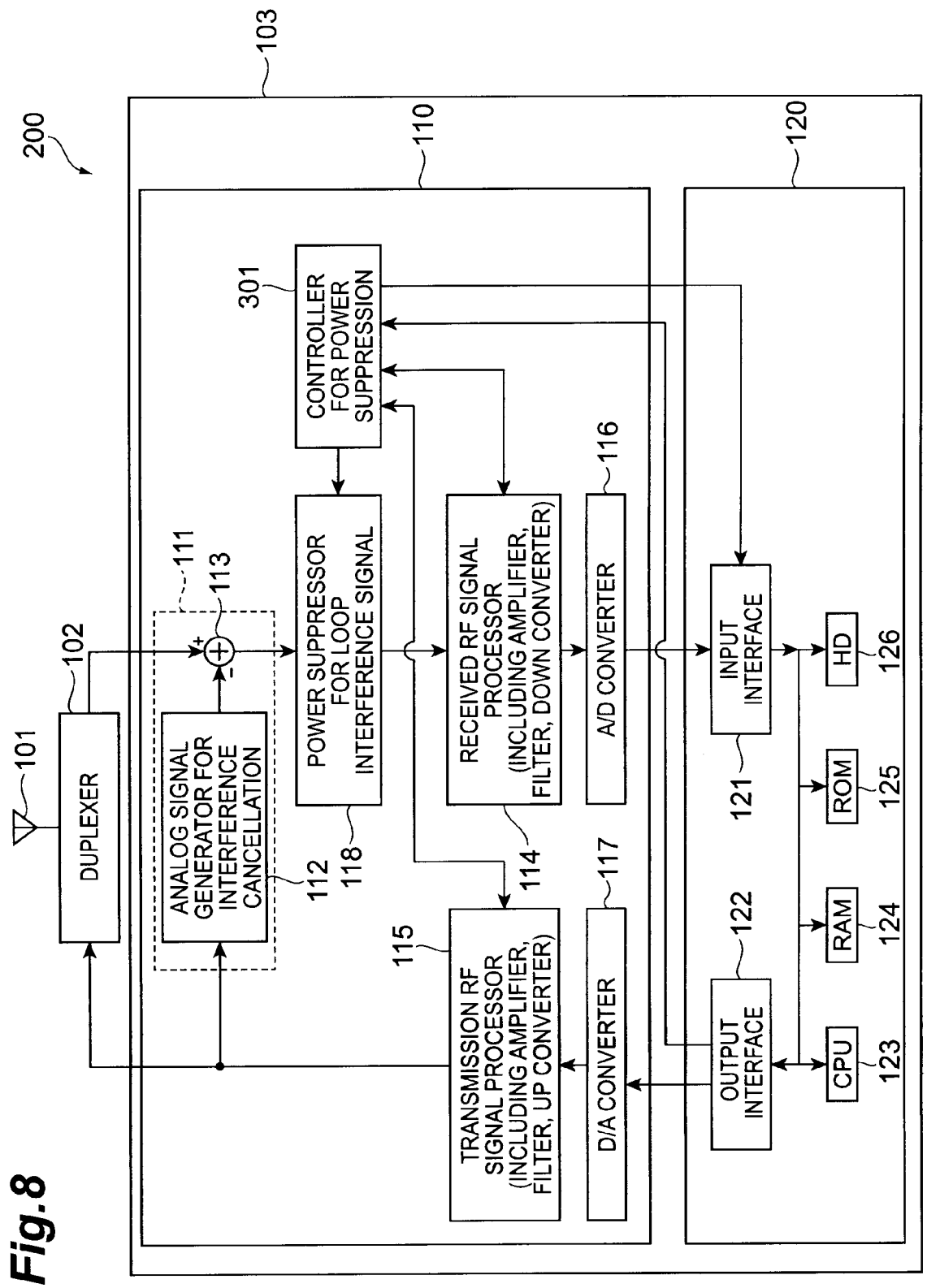
FIG. 8 is a hardware block diagram of the radio communication apparatus according to a second embodiment.

The structure of the radio communication apparatus according to the second embodiment of the present invention will be described next. The hardware structure of the radio communication apparatus of this embodiment is shown in FIG. 8. The radio communication apparatus 200 of this embodiment is characterized by further providing the structure of the radio communication apparatus of the first embodiment shown in FIG. 1 with a controller for power suppression 301. The controller for power suppression 301 controls at least one of the signal attenuation amount of the power suppressor for coupling loop interference signal 118, the magnitude of the output signal of the received RF signal processor 114, the magnitude of the output signal of the transmission RF signal processor 115, and the magnitude of the output of the digital signal processor 120, in response to at least one of the current output of the received RF signal processor 114, the current output of the transmission RF signal processor 115, and the current output of the digital signal processor 120.

Figure 9:
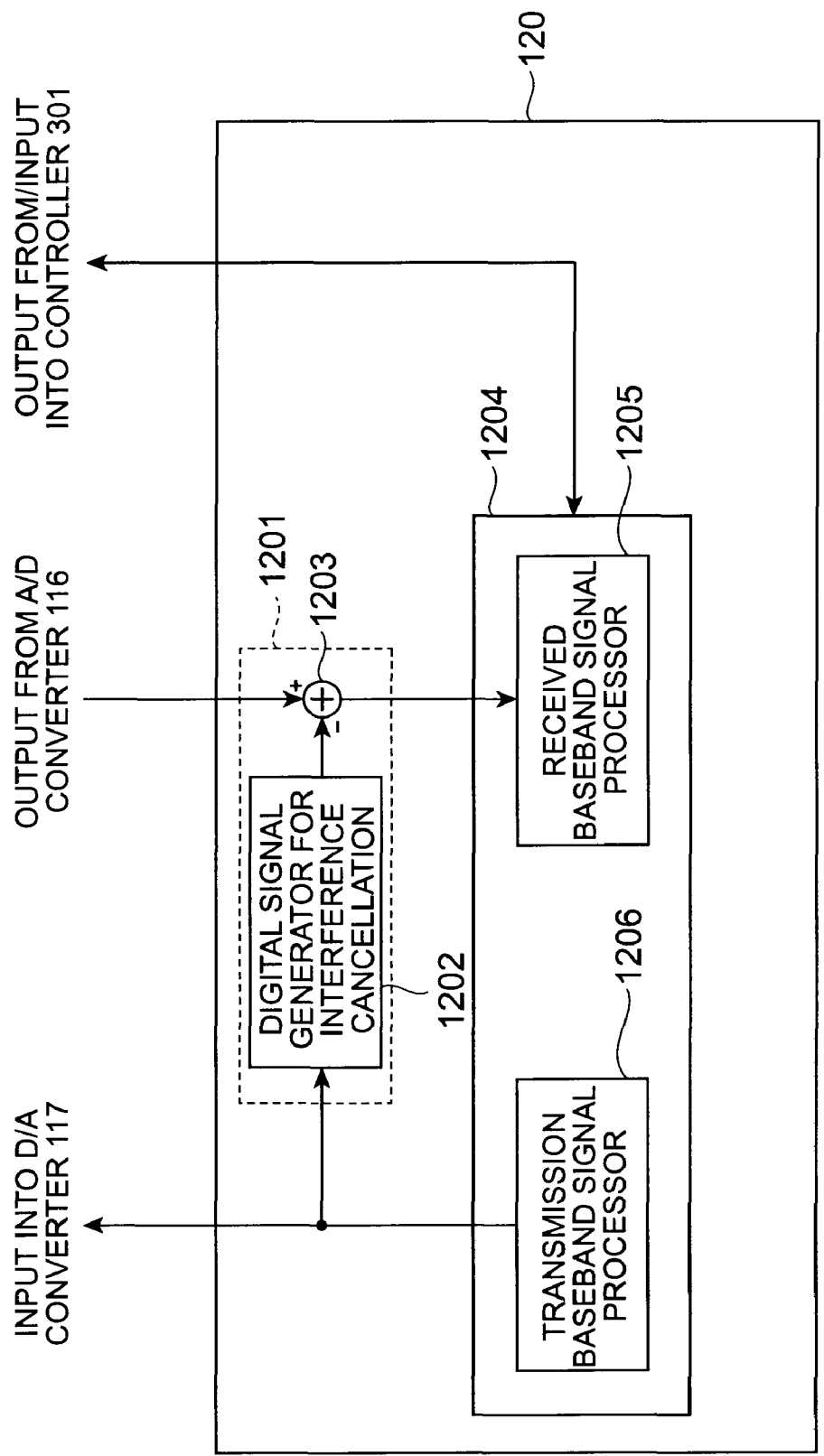
FIG. 9 is a functional block diagram of a digital signal processor according to the second embodiment.

A functional block diagram of the digital signal processor 120 of this embodiment is shown in FIG. 9. The structure of the digital signal processor 120 is similar to that of the first embodiment but differs in that the output of the baseband signal processor 1204 is input to the controller for power suppression 301, the controller for power suppression 301 determines the magnitude of the output applied by the baseband signal processor 1204 after control and, based on the result, the baseband signal processor 1204 controls the magnitude of the output of the transmission baseband signal processor 1206.

Figure 10:
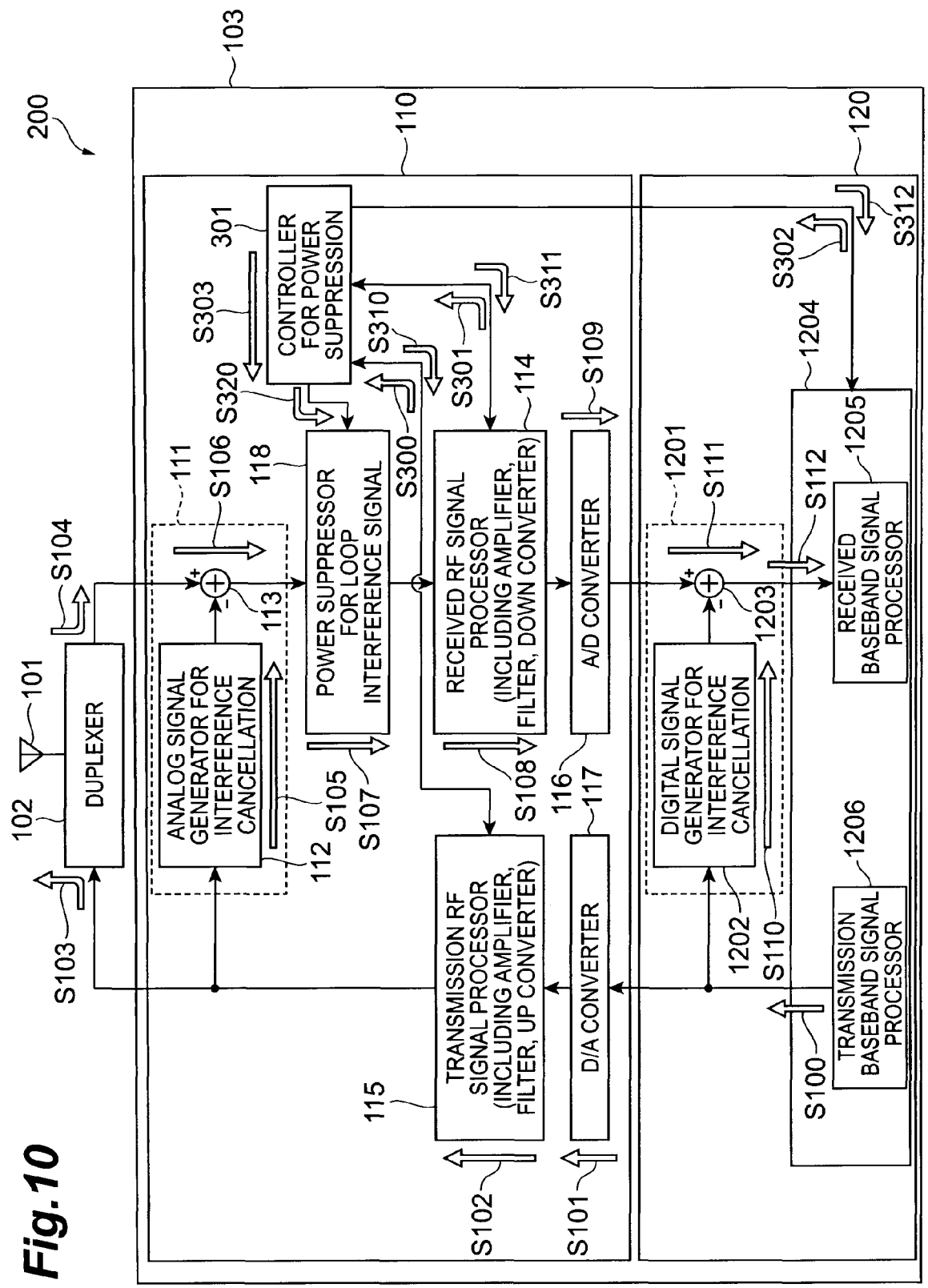
FIG. 10 is a block diagram of a procedure for a radio communication apparatus according to the second embodiment.

The operation of the radio communication apparatus of this embodiment will be described next together with the radio communication method of the embodiment of the present invention. FIG. 10 shows the procedure for performing transmission and reception of the radio communication apparatus of this embodiment.

The radio communication method of this embodiment is characterized by having steps S300 to S302, S303, S310 to S312, and S320 in addition to the procedure of FIG. 3 illustrated in the first embodiment. In step S300, the current magnitude of the output signal in the transmission RF signal processor 115 is input to the controller for power suppression 301 and, at the same time, the current magnitude of the output signal in the received RF signal processor 114 is input to the controller for power suppression 301 in step S301. In step S302, the magnitude of the output of the transmission baseband signal processor 1206 in the baseband signal processor 1204 is input to the controller for power suppression 301.

In step S303, the controller for power suppression 301 determines the signal attenuation amount of the power suppressor for coupling loop interference signal 118, the magnitude of the output signal of the transmission RF signal processor 115, the magnitude of the output signal of the received RF signal processor 114, and the magnitude of the output of the transmission baseband signal processor 1206 for alleviating the effect of signal saturation that arises in the coupling loop interference signal.

Further, the controller for power suppression 301 communicates the signal attenuation amount in the power suppressor for coupling loop interference signal 118 to the power suppressor for coupling loop interference signal 118 in step S320 and communicates the magnitude of the output signal of the transmission RF signal processor 115 to the transmission RF signal processor 115 in step S310. In step S311, the controller for power suppression 301 communicates the magnitude of the output signal of the received RF signal processor 114 to the received RF signal processor 114 and, in step S312, communicates the magnitude of the output of the transmission baseband signal processor 1206 to the baseband signal processor 1204.

Thereafter, the power suppressor for coupling loop interference signal 118 attenuates the signal by using the signal attenuation amount thus communicated and the transmission RF signal processor 115 outputs a signal with the output signal magnitude thus communicated. The received RF signal processor 114 outputs a signal with the output signal magnitude thus communicated and the transmission baseband signal processor 1206 outputs a signal with the communicated output magnitude.

Here, for steps S300 to S302, a case where all of the steps S300 to S302 are executed was illustrated above, but at least one step may be executed. Further, so too for steps S310 to S312 and S320, a case where all of the steps are executed was described hereinabove, but at least one step may be executed.

Thus, the radio communication method comprises a control step of controlling at least one of the magnitude of the signal power attenuated in the power suppression step, the magnitude of the output signal power in the transmission RF signal processing step, the magnitude of the output signal power in the received RF signal processing step, and the magnitude of the output of the baseband signal processing step, wherein the control step is characterized by performing control in response to at least one of the magnitude of the output power of the transmission RF signal processing step, the magnitude of the output power of the received RF signal processing step, and the magnitude of the output of the baseband signal processing step.

As a result of this method, because control of the magnitude of the output power that corresponds with a permissible power that differs for each signal processor of the analog domain is possible, the effect of signal saturation that arises in the coupling loop interference signal can be further alleviated. As a result, in order to adequately remove the effect of the coupling loop interference signal, radio communication transmission and reception not requiring adequate separation of the uplink RF carrier frequency and the downlink RF carrier frequency can be implemented in the FDD system.

Third Embodiment

Figure 11:
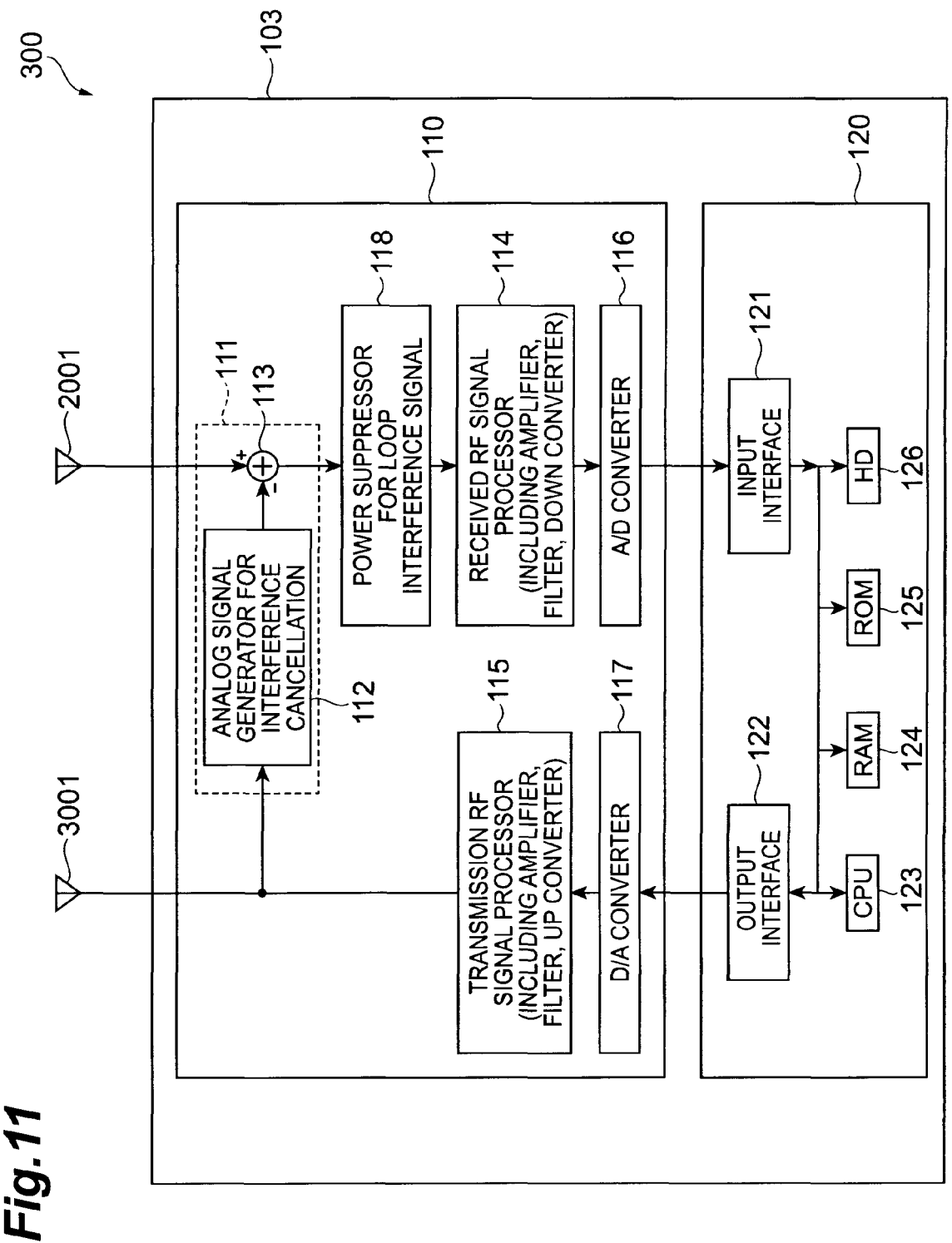
FIG. 11 is a hardware block diagram of the radio communication apparatus according to a third embodiment.

The radio communication apparatus according to the third embodiment of the present invention will be described next. FIG. 11 shows the hardware structure of the radio communication apparatus according to the third embodiment of the present invention. The radio communication apparatus 300 according to this embodiment differs from the radio communication apparatus of the first embodiment shown in FIG. 1 and is characterized by comprising a reception antenna 2001 and a transmission antenna 3001 separately. For the functional blocks of the digital signal processor 120 of this embodiment, the same functional blocks as the functional blocks of the first embodiment shown in FIG. 2 can be employed.

Figure 12:
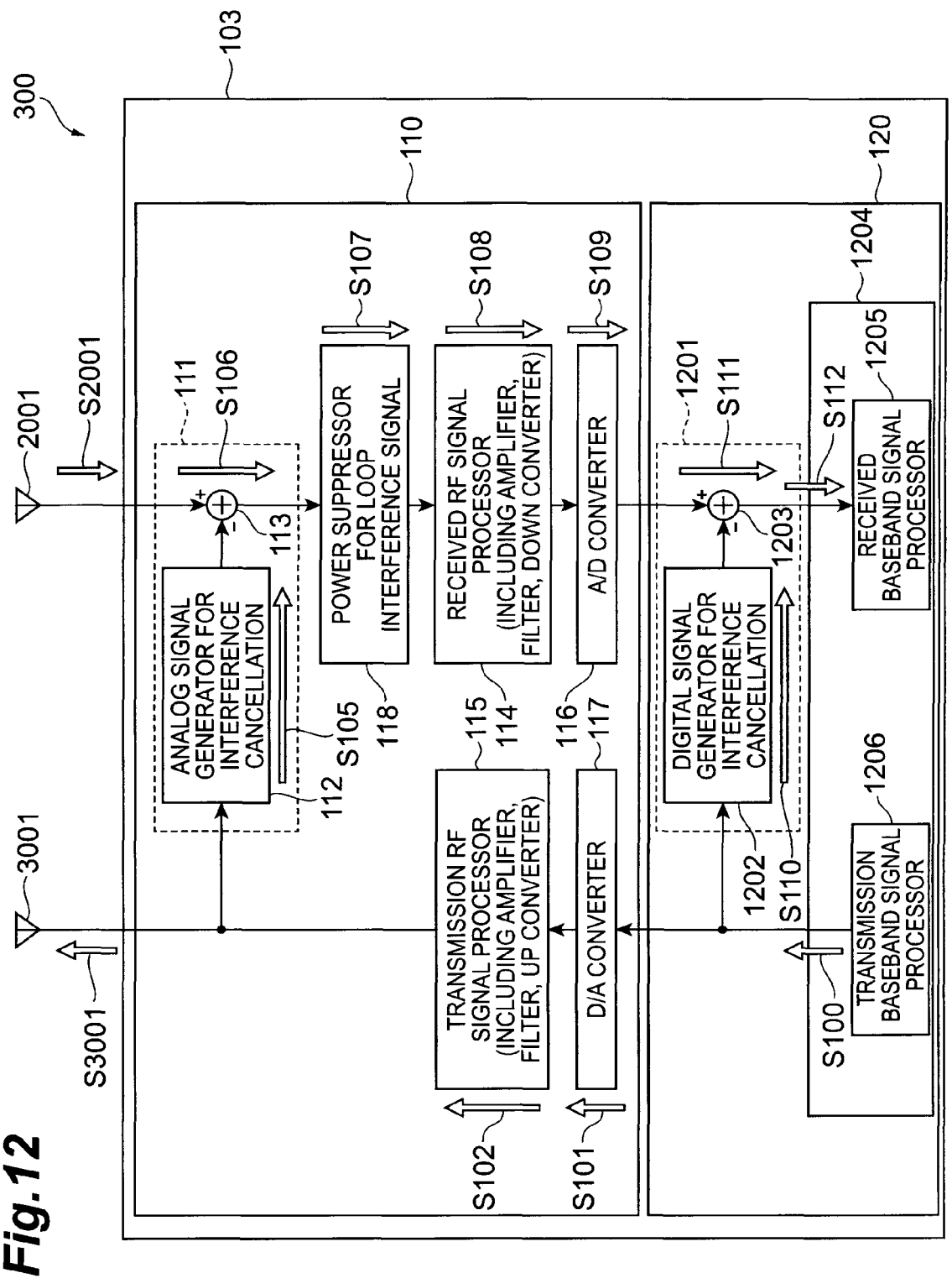
FIG. 12 is a block diagram of a procedure for a radio communication apparatus according to the third embodiment.

The operation of the radio communication apparatus of this embodiment will now be described. FIG. 12 shows the procedure for performing transmission and reception of the radio communication apparatus according to the third embodiment. As mentioned earlier, the radio communication apparatus of this embodiment is characterized by comprising the transmission antenna 3001 and reception antenna 2001 separately and the output signal of the transmission RF signal processor 115 is transmitted by the transmission antenna 3001 in step S3001. In the meantime, the signal received by the reception antenna 2001 is input to the analog domain interference canceller 111 in step S2001.

The action and effect of the radio communication apparatus of this embodiment will be described next. Because the radio communication apparatus comprises the transmission antenna 3001 and the reception antenna 2001 separately, the radio communication apparatus differs from that of the first embodiment and is not subject to the effect of the coupling loop interference signal that arises from the imperfections of the duplexer. However, the signal that is transmitted by the transmission antenna 3001 is received by the reception antenna 2001 after being subjected to the effect of the peripheral transmission environment such as reflection and diffraction to produce a coupling loop interference signal and is superposed on the desired received signal. In particular, in the FDD system, in cases where the uplink RF carrier frequency and downlink RF carrier frequency are not adequately separated, the signal quality of the desired received signal drops as a result of the influence of the coupling loop interference signal and the detection performance deteriorates. Therefore, because the radio communication apparatus of this embodiment which comprises the transmission antenna 3001 and reception antenna 2001 separately is also subjected to the effect of the coupling loop interference signal, as per the first embodiment, the coupling loop interference signal is removed by the digital domain interference canceller 1201 and the analog domain interference canceller 111. In addition, because the effect of signal saturation that arises in the coupling loop interference signal can be alleviated by attenuating the signal power in the power suppressor for coupling loop interference signal 118, the coupling loop interference signal removal characteristic can be improved. As a result, in a radio communication apparatus that comprises a transmission antenna 3001 and reception antenna 2001 separately, an FDD system not requiring adequate separation between the uplink RF carrier frequency and the downlink RF carrier frequency can be implemented.

Fourth Embodiment

Figure 13:
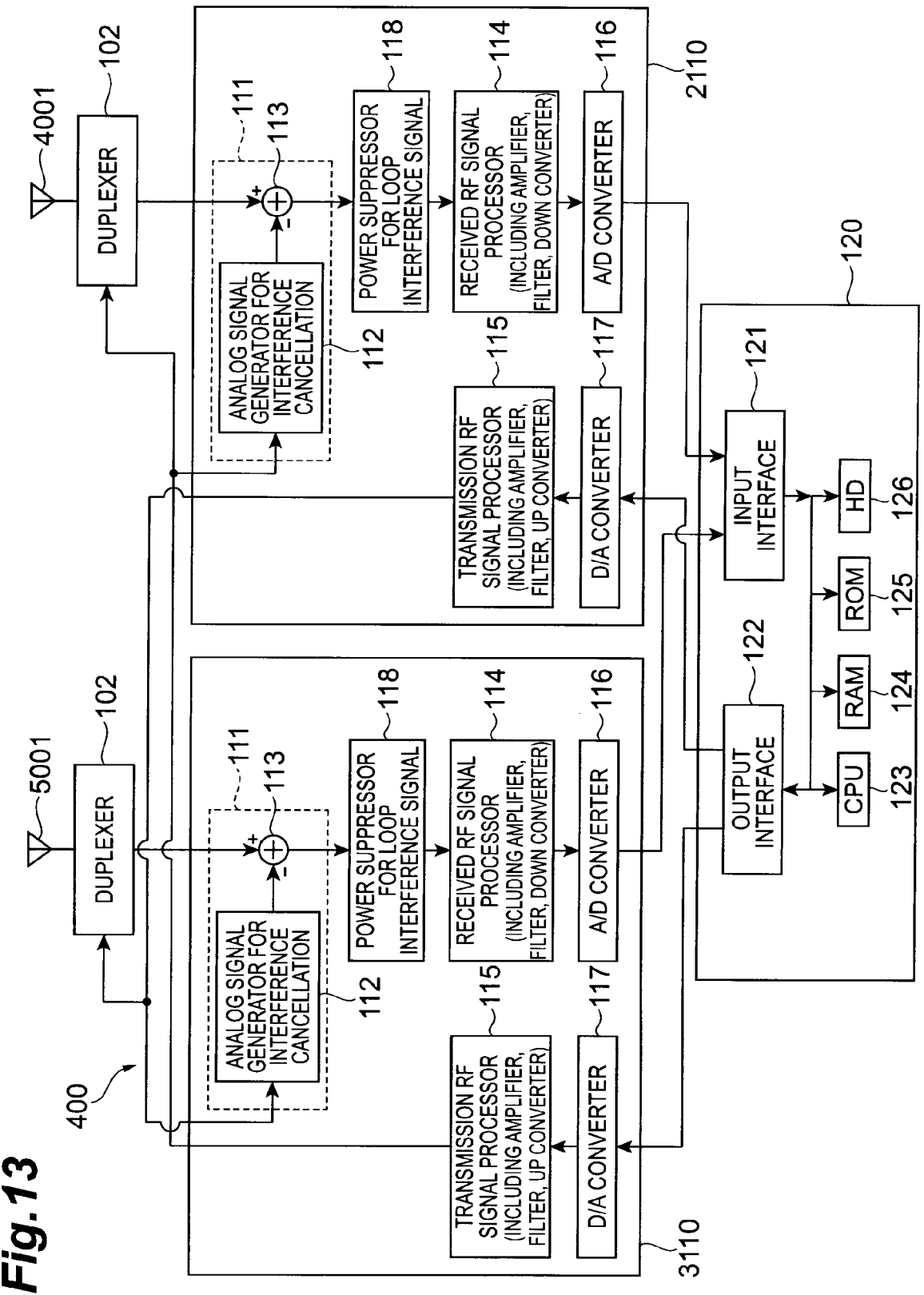
FIG. 13 is a hardware block diagram of the radio communication apparatus according to a fourth embodiment.

The structure of the radio communication apparatus according to the fourth embodiment of the present invention will be described next. FIG. 13 shows the hardware structure of the radio communication apparatus 400 according to the fourth embodiment of the present invention. The hardware structure of the radio communication apparatus of this embodiment is characterized by comprising an uplink analog signal processor 2110 as the uplink signal processor, a downlink analog signal processor 3110 as the downlink signal processor, an antenna 4001 for communication with mobile stations, and an antenna 5001 for communication with base stations and functions as an FDD system booster. Here, the antenna 4001 transmits a downlink signal to the mobile station at the same time as receiving an uplink signal which is transmitted by the mobile station. Further, the antenna 5001 transmits an uplink signal to the base station at the same time as receiving a downlink signal that is transmitted by the base station. The uplink analog signal processor 2110 and downlink analog signal processor 3110 can employ the same structure as the analog signal processor 110 of the first embodiment shown in FIG. 1.

In the radio communication apparatus of this embodiment, a transmission signal from the mobile station received by the antenna 4001 is input to the analog domain interference canceller 111 of the uplink analog signal processor 2110 via the duplexer 102 connected to the antenna 4001. Meanwhile, the output signal of the transmission RF signal processor 115 of the uplink analog signal processor 2110 is transmitted by the antenna 5001 via the duplexer 102 connected to the antenna 5001 and input to the analog signal generator for interference cancellation 112 of the downlink analog signal processor 3110.

Further, the transmission signal from the base station received by antenna 5001 is input to the analog domain interference canceller 111 in the downlink analog signal processor 3110 via the duplexer 102 connected to the antenna 5001. Meanwhile, the output signal of the transmission RF signal processor 115 in the downlink analog signal processor 3110 is transmitted by the antenna 4001 via the duplexer 102 connected to the antenna 4001 and input to the analog signal generator for interference cancellation 112 in the uplink analog signal processor 2110.

The output signal of the A/D converter 116 of the uplink analog signal processor 2110 and the output signal of the A/D converter 116 of the downlink analog signal processor 3110 are input to the input interface 121 in the digital signal processor 120. Further, in the digital signal processor 120, the digital signal generated for an uplink is input to the D/A converter 117 in the uplink analog signal processor 2110 via the output interface 122. Likewise, in the digital signal processor 120, the digital signal generated for a downlink is input to the D/A converter 117 in the downlink analog signal processor 3110 via the output interface 122.

Figure 14:
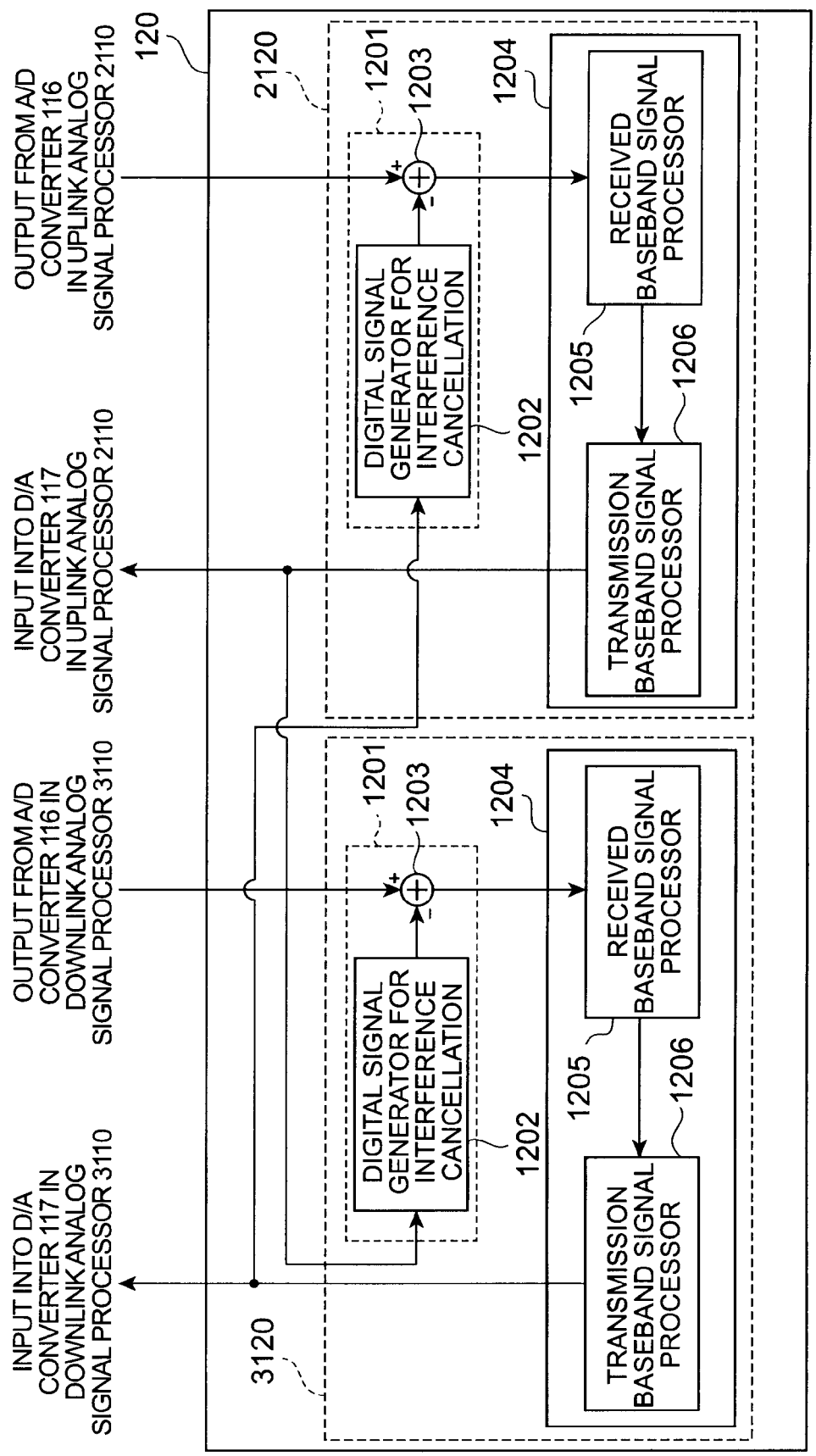
FIG. 14 is a functional block diagram of a digital signal processor according to the fourth embodiment.

A functional block diagram of the digital signal processor 120 of this embodiment is shown next in FIG. 14. An uplink digital signal processor 2120 and a downlink digital signal processor 3120 are provided and the functional blocks of the respective digital signal processors can be the same functional blocks as the functional blocks of the digital signal processor of the first embodiment shown in FIG. 2.

The digital domain interference canceller 1201 of the uplink digital signal processor 2120 has the output signal of the A/D converter 116 in the uplink analog signal processor 2110 input thereto and uses the signal generated by the digital signal generator for interference cancellation 1202 of the uplink digital signal processor 2120 to perform removal of the coupling loop interference signal. Here, the digital signal generator for interference cancellation 1202 of the uplink digital signal processor 2120 uses the output signal of the transmission baseband signal processor 1206 in the downlink digital signal processor 3120 to generate an interference removal digital signal.

The digital domain interference canceller 1201 of the downlink digital signal processor 3120 receives the output signal of the A/D converter 116 in the downlink analog signal processor 3110 and uses the signal generated by the digital signal generator for interference cancellation 1202 of the downlink digital signal processor 3120 to remove the coupling loop interference signal. Here, the digital signal generator for interference cancellation 1202 of the downlink digital signal processor 3120 generates the interference removal digital signal by using the output signal of the transmission baseband signal processor 1206 of the uplink digital signal processor 2120.

In the respective uplink digital signal processor 2120 and downlink digital signal processor 3120, the signal detected by the received baseband signal processor 1205 is input to the transmission baseband signal processor 1206 and input to the D/A converter 117 in the respective link analog signal processors to perform signal transmission, whereby the radio communication apparatus functions as an FDD system booster.

Figure 15:
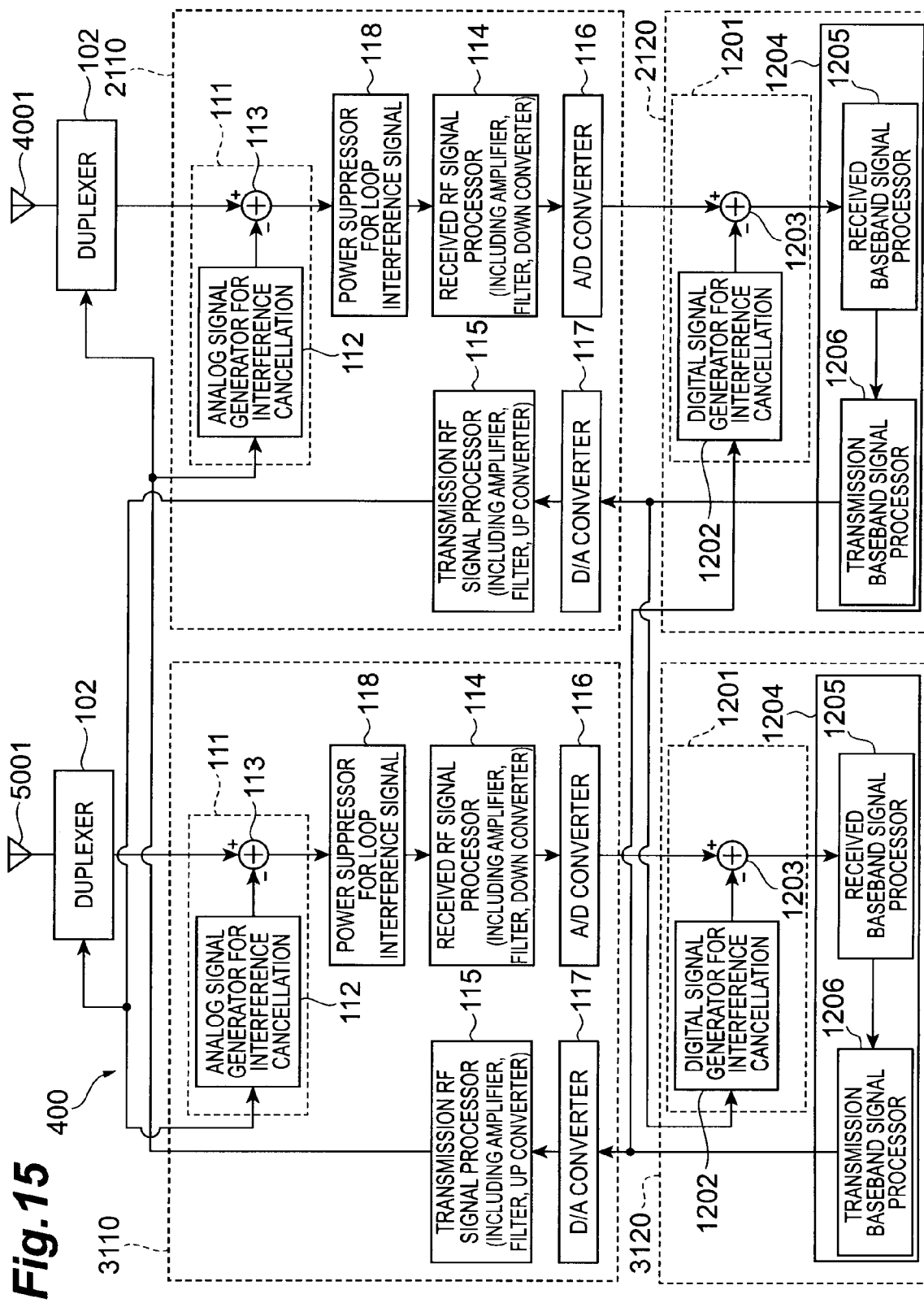
FIG. 15 is a block diagram of a procedure for the radio communication apparatus according to the fourth embodiment.

The operation of the radio communication apparatus of this embodiment will be described next as well as the action and effects thereof. FIG. 15 shows the procedure for transmission and reception of the radio communication apparatus of this embodiment.

Thus, the radio communication apparatus that operates as an FDD system booster as mentioned earlier comprises an uplink signal processor comprising the uplink analog signal processor 2110 and uplink digital signal processor 2120 and a downlink signal processor comprising the downlink analog signal processor 3110 and downlink digital signal processor 3120. And interference cancellers and power suppressors for coupling loop interference signal for both analog domain and digital domain work in order to reduce the effect of the coupling loop interference signal produced when the uplink RF carrier frequency and the downlink RF carrier frequency are adjacent to one another. Here, because part of the downlink transmission signal for performing transmission from the antenna 4001 to the mobile station is superposed as a coupling loop interference signal on the received signal of the antenna 4001 that receives the uplink signal transmitted by the mobile station, the uplink analog domain interference canceller and the uplink digital domain interference canceller remove the coupling loop interference signal by using the downlink transmission signal generated in order to perform transmission from the antenna 4001 to the mobile station.

Likewise, because part of the uplink transmission signal for performing transmission from the antenna 5001 to the base station is superposed as a coupling loop interference signal on the received signal of the antenna 5001 that receives the downlink signal transmitted by the base station, the downlink analog domain interference canceller and the downlink digital domain interference canceller remove the coupling loop interference signal by using the uplink transmission signal generated in order to perform transmission from the antenna 5001 to the base station. As a result, in the case of the radio communication apparatus that operates as an FDD system booster, because the effect of the coupling loop interference signal that arises in cases where the uplink RF carrier frequency and the downlink RF carrier frequency are adjacent to one another can be reduced, the radio communication apparatus can be used as a booster for an FDD system not requiring adequate separation of the uplink RF carrier frequency and downlink RF carrier frequency.

Fifth Embodiment

Figure 16:
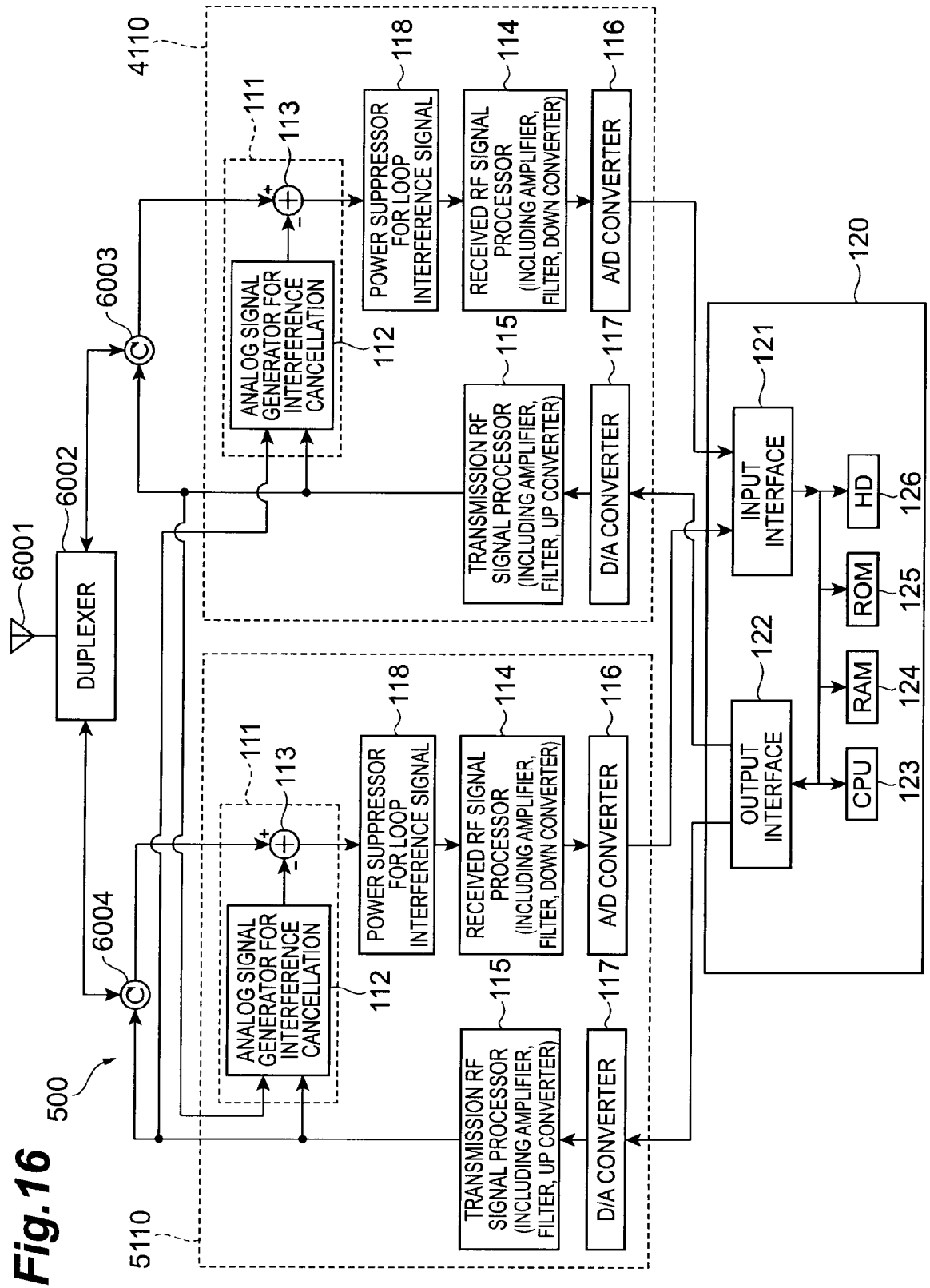
FIG. 16 is a hardware block diagram of a radio communication apparatus according to a fifth embodiment.

The structure of the radio communication apparatus of the fifth embodiment of the present invention will be described next. FIG. 16 shows the hardware structure of the radio communication apparatus 500 according to the fifth embodiment of the present invention. The radio communication apparatus of this embodiment differs from that of the first embodiment shown in FIG. 1 and is characterized by the fact that transmission and reception are executed simultaneously at the same time (in the same time slot) at the uplink RF carrier frequency and the downlink RF carrier frequency respectively.

That is, in the case of the radio communication apparatus of the first embodiment, when the radio communication apparatus is used as the base station, signal transmission is performed at the downlink RF carrier frequency and signal reception is carried out at the uplink RF carrier frequency. Further, when the radio communication apparatus is used as the mobile station, signal transmission is performed at the uplink RF carrier frequency and signal reception is performed at the downlink RF carrier frequency. In contrast, the radio communication apparatus according to the fifth embodiment is characterized by the fact that, in cases where the radio communication apparatus is used as the base station or a mobile station, transmission and reception are performed simultaneously at the uplink RF carrier frequency and transmission and reception are performed simultaneously at the downlink RF carrier frequency.

The radio communication apparatus comprises an antenna 6001, a duplexer 6002, circulators 6003 and 6004, an uplink analog signal processor 4110, a downlink analog signal processor 5110, and the digital signal processor 120. The circulator 6003 connected to the uplink analog signal processor 4110 inputs a received signal at the uplink RF carrier frequency received by the antenna 6001 via the duplexer 6002 to the uplink analog signal processor 4110. The transmission signal generated by the uplink analog signal processor 4110 is transmitted by the antenna 6001 via the circulator 6003 and duplexer 6002. Meanwhile, the circulator 6004 connected to the downlink analog signal processor 5110 inputs the received signal at the downlink RF carrier frequency received from the antenna 6001 via the duplexer 6002 to the downlink analog signal processor 5110. The transmission signal generated by the downlink analog signal processor 5110 is transmitted by the antenna 6001 via the circulator 6004 and duplexer 6002.

The radio communication apparatus of this embodiment which performs transmission and reception simultaneously at the uplink RF carrier frequency and the downlink RF carrier frequency must alleviate the effect of the coupling loop interference signal that arises due to the imperfections of the circulators 6003 and 6004 in addition to the coupling loop interference signal that arises due to the imperfections of the duplexer 6002. As a result, the interference canceller 111 in the analog domain of the uplink analog signal processor 4110 uses both the signal generated in the transmission RF signal processor 115 of the uplink analog signal processor 4110 and the signal generated in the transmission RF signal processor 115 of the downlink analog signal processor 5110 to remove the coupling loop interference signal. Likewise, the interference canceller 111 in the analog domain of the downlink analog signal processor 5110 uses both the signal generated in the transmission RF signal processor 115 of the downlink analog signal processor 5110 and the signal generated in the transmission RF signal processor 115 of the uplink analog signal processor 4110 to remove the coupling loop interference signal.

The digital signal processor 120 receives signals that were converted to digital signals in the A/D converter 116 of the respective uplink/downlink analog signal processors, and a digital signal for transmission that is generated for an uplink/downlink in the digital signal processor 120 is input to the uplink/downlink D/A converter 117.

Figure 17:
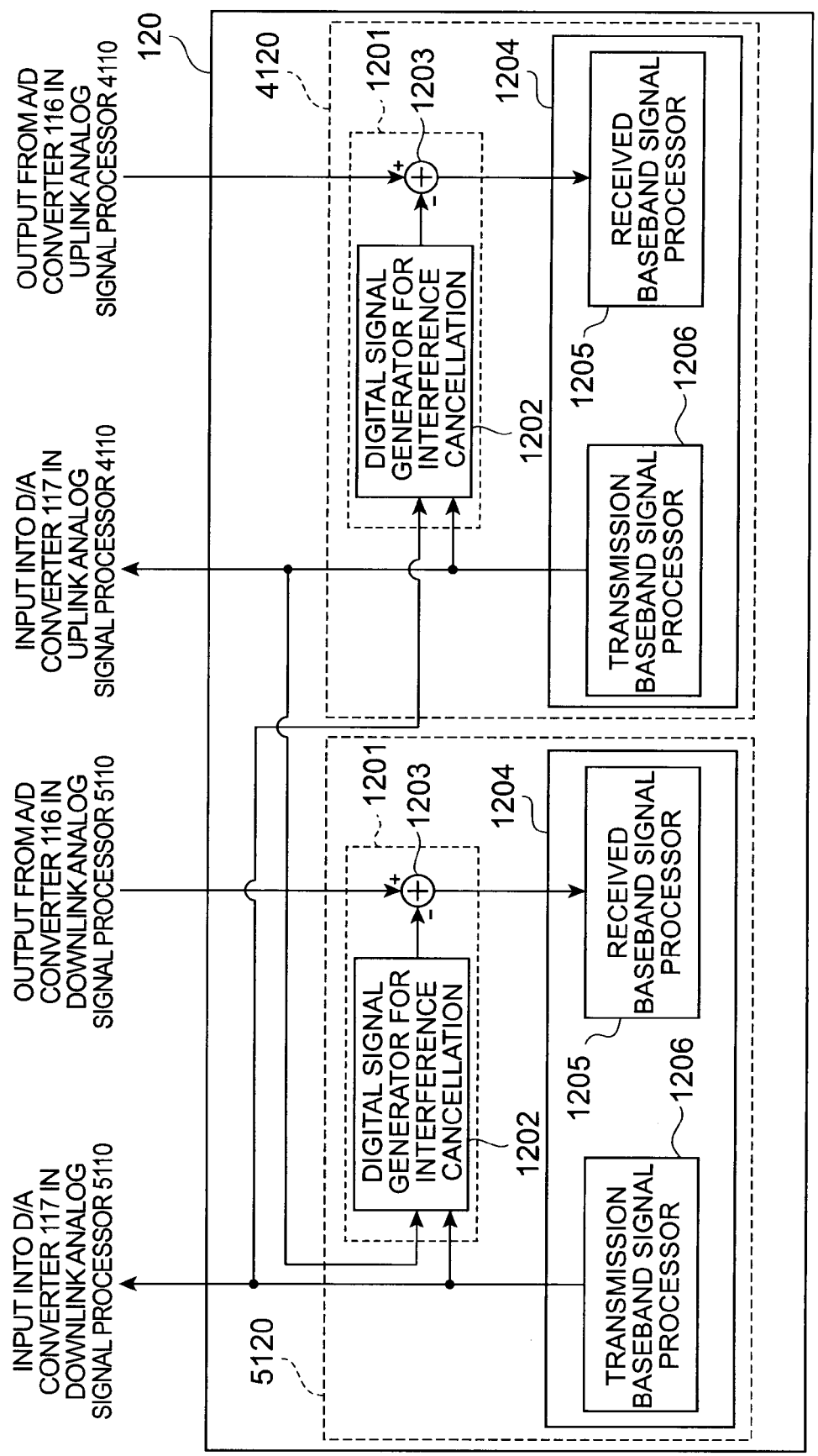
FIG. 17 is a functional block diagram of a digital signal processor according to the fifth embodiment.

The functional block diagram of the digital signal processor 120 of this embodiment is shown next in FIG. 17. As per the coupling loop interference signal removal of the analog signal processor, in the digital signal processor 120 of the radio communication apparatus that performs transmission and reception simultaneously at the uplink RF carrier frequency and the downlink RF carrier frequency, the digital signal generator for interference cancellation 1202 in the uplink digital signal processor 4120 uses both the output of the transmission baseband signal processor 1206 of the uplink digital signal processor 4120 and the output of the transmission baseband signal processor 1206 of the downlink digital signal processor 5120 to generate a digital signal that is used for interference removal in the digital domain. Likewise, the digital signal generator for interference cancellation 1202 in the downlink digital signal processor 5120 uses both the output of the transmission baseband signal processor 1206 of the uplink digital signal processor 4120 and the output of the transmission baseband signal processor 1206 of the downlink digital signal processor 5120 to generate a digital signal that is used for interference removal in the digital domain.

Figure 18:
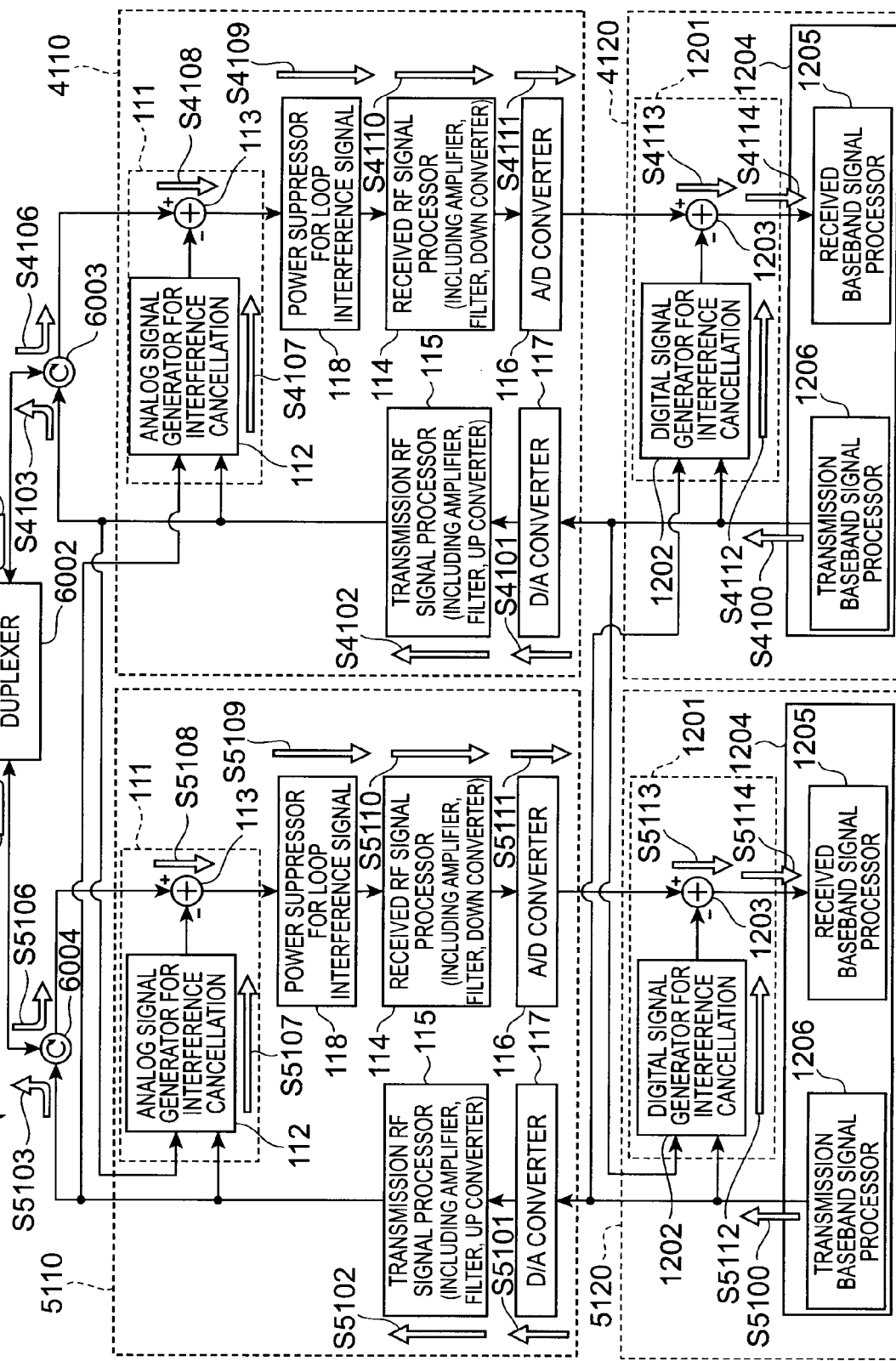
FIG. 18 is a block diagram of a procedure for the radio communication apparatus according to the fifth embodiment.

The operation of the radio communication apparatus of this embodiment will be described next as well as the action and effects thereof. FIG. 18 shows the procedure for performing transmission and reception of the radio communication apparatus of this embodiment.

In step S4100, the transmission baseband signal processor 1206 of the uplink digital signal processor 4120 generates a digital signal for performing transmission in the uplink RF carrier frequency. The generated signal is converted in step S4101 into an analog signal in the D/A converter 117 of the uplink analog signal processor 4110. Thereafter, in step S4102, the transmission RF signal processor 115 of the uplink analog signal processor 4110 performs signal amplification, band-limiting using a filter, and frequency conversion to an uplink RF carrier frequency by an upconverter. Subsequently, the generated signal is supplied to the duplexer 6002 via the circulator 6003 in step S4103, and is transmitted from the antenna 6001 in step S4104.

Meanwhile, the signal received from the antenna 6001 at the uplink RF carrier frequency is supplied to the circulator 6003 via the duplexer in step S4105. Subsequently, the signal supplied to the circulator 6003 in step S4106 is input to the uplink analog signal processor 4110. The coupling loop interference signal removal is performed for the signal input to the uplink analog signal processor 4110, in step S4108.

Here, in order to perform the coupling loop interference signal removal, the analog signal generator for interference cancellation 112 of the uplink analog signal processor 4110 uses the uplink transmission signal generated in step S4102 and the downlink transmission signal generated in the transmission RF signal processor 115 of the downlink analog signal processor 5110 in step S5102 to generate an interference removal analog signal. Further, in step S4108, the analog domain interference remover 113 of the uplink analog signal processor 4110 performs removal of the coupling loop interference signal by removing the signal generated in step S4107 from the signal input as a result of step S4106.

Thereafter, in step S4109, the power suppressor for coupling loop interference signal 118 of the uplink analog signal processor 4110 attenuates the signal power. Thereafter, in step S4110, the received RF signal processor 114 of the uplink analog signal processor 4110 performs amplification of the input signal, band-limiting using a filter, and frequency conversion to a baseband signal by a downconverter. Thereafter, in step S4111, the A/D converter 116 of the uplink analog signal processor 4110 converts the analog signal into a digital signal. Thereafter, the digital signal thus generated is input to the digital domain interference canceller 1201 of the uplink digital signal processor 4120 and, in step S4113, the digital domain interference signal remover 1203 performs removal of the coupling loop interference signal.

Here, when performing removal of the coupling loop interference signal, the digital signal generator for interference cancellation 1202 of the uplink digital signal processor 4120 uses the transmission signal in the uplink digital domain generated in step S4100 and the transmission signal in the downlink digital domain generated in step S5100 to generate an interference removal digital signal in step S4112. Further, in step S4113, the digital domain interference signal remover 1203 of the uplink digital signal processor 4120 performs removal of the coupling loop interference signal by removing the signal generated in step S4112 from the signal generated in step S4111. The removed signal is output to the received baseband signal processor 1205 in step S4114.

Meanwhile, for the downlink, where the downlink analog signal processor 5110 and the downlink digital signal processor 5120 are concerned, other than the fact that the carrier frequency used by the transmission RF signal processor 115 of the downlink analog signal processor 5110 in step S5102 and the carrier frequency used by the received RF signal processor 114 of the downlink analog signal processor 5110 in step S5110 are used for the downlink RF carrier frequency, the transmission and reception of signals and the removal of the coupling loop interference signal are performed by means of the same method as that used for the uplink.

As a result, in the case of the radio communication apparatus that performs transmission and reception simultaneously at the uplink RF carrier frequency and downlink RF carrier frequency respectively, the effect of the coupling loop interference signal from the same link superposed on the received signal of the respective links can be alleviated and the effect of the coupling loop interference signal from the other link can be alleviated. As a result, because transmission and reception can be performed simultaneously at the uplink RF carrier frequency and downlink RF carrier frequency respectively, the utilization efficiency of the frequency can be improved.

Further, because the effect of the coupling loop interference signal that arises when the uplink RF carrier frequency and downlink RF carrier frequency are adjacent to one another can be alleviated, in cases where transmission and reception are performed simultaneously at the uplink RF carrier frequency and the downlink RF carrier frequency, it is possible to perform communications without the need for adequate separation between the uplink RF carrier frequency and the downlink RF carrier frequency.

Furthermore, in the case of the radio communication apparatus structure and radio communication transmission/reception method, as shown in the second embodiment, the uplink/downlinks are further provided with a controller for power suppression and the controller for power suppression may control at least one of the signal attenuation amount in the power suppressor for coupling loop interference signal, the magnitude of the output signal in the received RF signal processor, the magnitude of the output signal of the transmission RF signal processor, and the magnitude of the output of the digital signal processor, which are applied after the control, in response to at least one of the current output of the received RF signal processor, the current output of the transmission RF signal processor, and the current output of the baseband signal processor.

Figure 19:
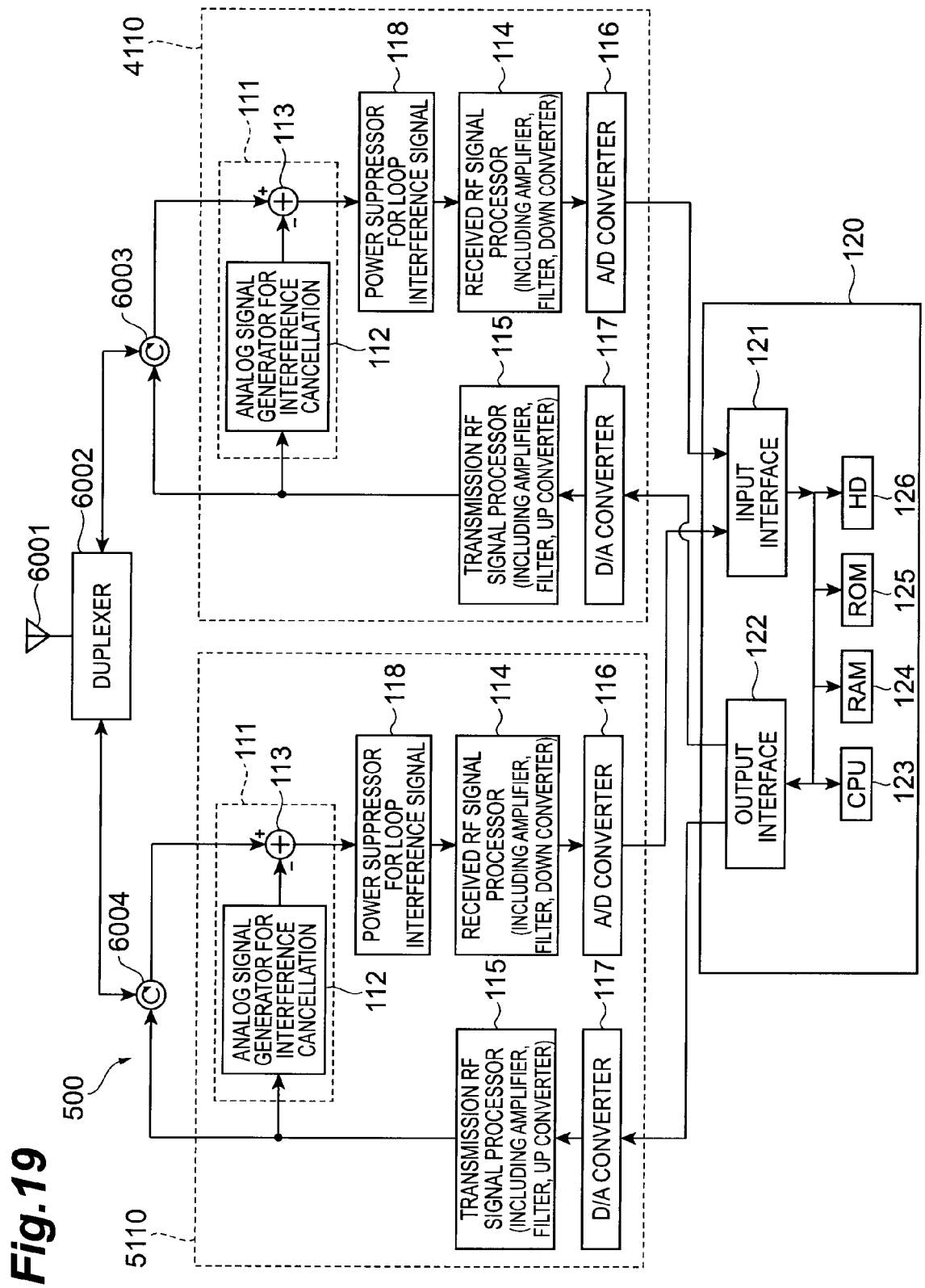
FIG. 19 is a modified example of a hardware block diagram of the radio communication apparatus according to the fifth embodiment.

Furthermore, in the radio communication apparatus that performs transmission and reception simultaneously at the uplink RF carrier frequency and downlink RF carrier frequency, in cases where the effect of the coupling loop interference signal that arises due to the imperfections of the circulators 6003 and 6004 are dominant in comparison with the effect of the coupling loop interference signal that arises due to the imperfections of the duplexer 6002, the hardware block diagram shown in FIG. 19 may be used as a modified example. The structure shown in FIG. 19 differs from the structure shown in FIG. 16 and the analog signal generator for interference cancellation 112 of the uplink analog signal processor 4110 uses only the signal generated in the transmission RF signal processor 115 of the uplink analog signal processor 4110 to generate an interference removal analog signal and the analog signal generator for interference cancellation 112 of the downlink analog signal processor 5110 uses only the signal generated in the transmission RF signal processor 115 of the downlink analog signal processor 5110 to generate the interference removal analog signal.

Figure 20:
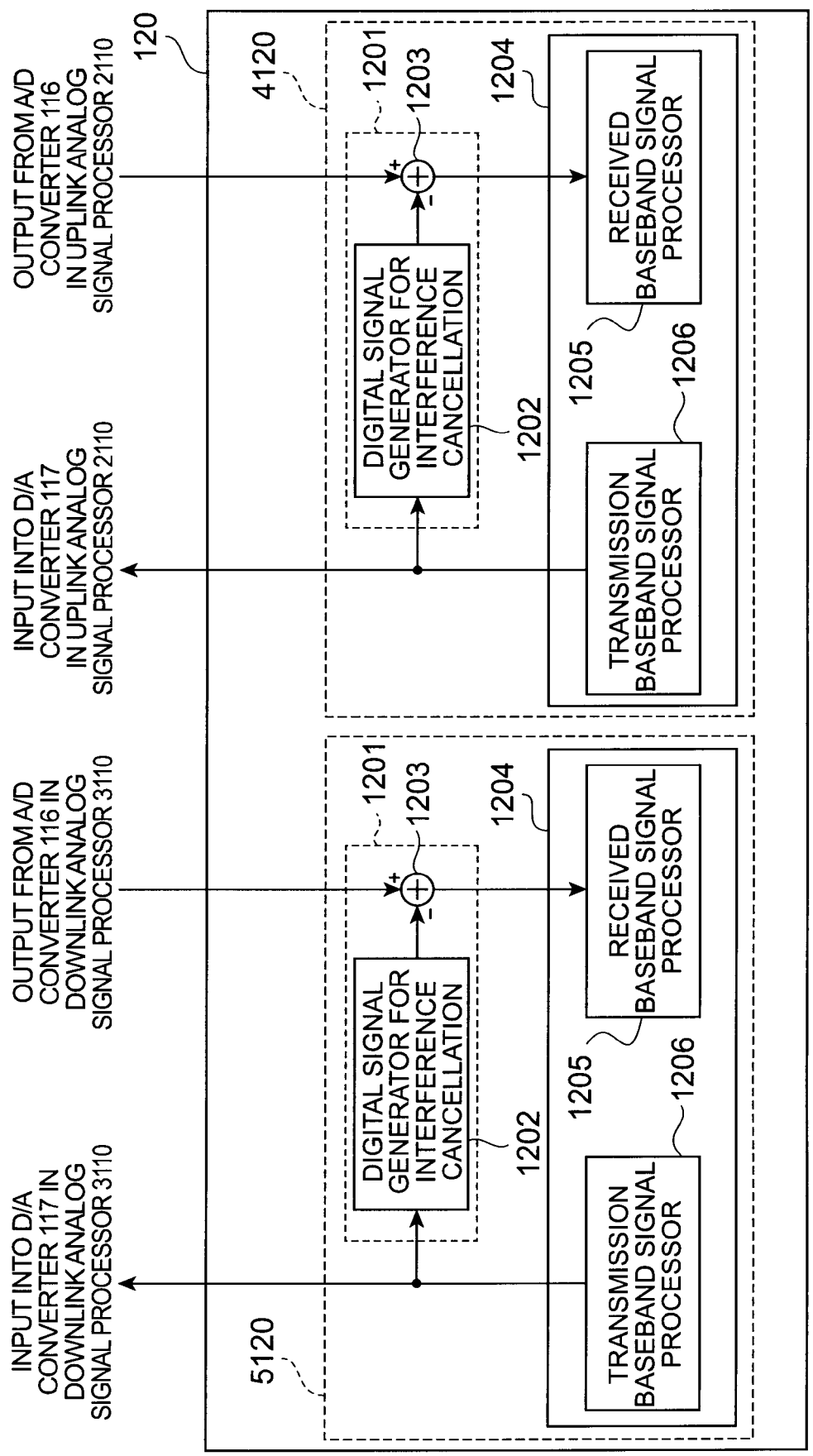
FIG. 20 is a modified example of the functional block diagram of the digital signal processing according to the fifth embodiment.

A functional block diagram of the digital signal processor 120 of this modified example is shown in FIG. 20. The difference from the structure shown in FIG. 17 lies in the fact that the digital signal generator for interference cancellation 1202 of the uplink digital signal processor 4120 generates an interference removal digital signal by using only the signal that is generated in the transmission baseband signal processor 1206 of the uplink digital signal processor 4120 and the digital signal generator for interference cancellation 1202 of the downlink digital signal processor 5120 generates an interference removal digital signal by using only the signal that is generated in the transmission baseband signal processor 1206 of the downlink digital signal processor 5120. As a result, the procedure of the radio communication apparatus of this modified example is the procedure shown in FIG. 21. The difference between the procedure of FIG. 21 and the procedure of FIG. 18 lies in the fact that, in step S4107, an interference removal analog signal is generated by using only the signal generated in step 4102; in step S4112, an interference removal digital signal is generated by using only the signal generated in step S4100; in step S5107, an interference removal analog signal is generated by using only the signal generated in step S5102; and, in step S5112, an interference removal digital signal is generated by using only the signals generated in step S5100.

Figure 21:
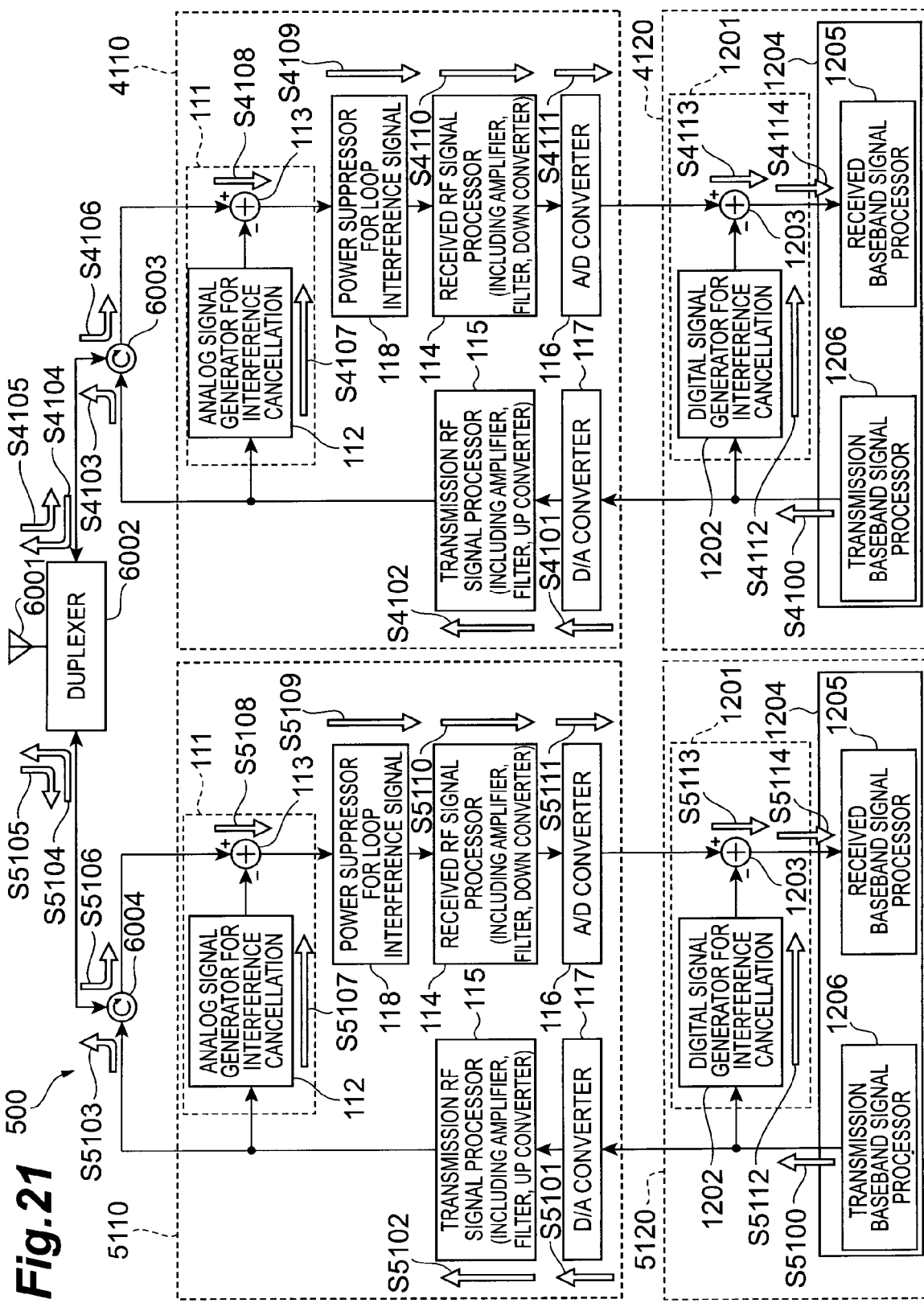
FIG. 21 is a modified example of the block diagram of the procedure for the radio communication apparatus according to the fifth embodiment.

According to the above description, in cases where the effect of the coupling loop interference signal that arises due to the imperfections of the circulators 6003 and 6004 are dominant in comparison with the effect of the coupling loop interference signal that arises due to the imperfections of the duplexer 6002, the modified example shown in FIGS. 19, 20 and 21 may be used as a modified example. Thus, it is possible to simplify the radio communication apparatus and procedure and, in cases where transmission and reception are performed simultaneously at the uplink RF carrier frequency and at the downlink RF carrier frequency respectively, communication can be performed without the need for adequate separation between the uplink RF carrier frequency and the downlink RF carrier frequency.

In a conventional FDD system that does not perform simultaneous transmission and reception in the same RF carrier frequency, the uplink RF carrier frequency and the downlink RF carrier frequency are used separately and the uplink RF carrier frequency and downlink RF carrier frequency are used as a pair set for transmission and reception as follows: in the case of the base station, transmission at the downlink RF carrier frequency and reception at the uplink RF carrier frequency is performed simultaneously. In the case of the mobile station, reception at the downlink RF carrier frequency and transmission at the uplink RF carrier frequency are performed simultaneously. In contrast, in this embodiment, which performs transmission and reception simultaneously at the uplink RF carrier frequency and downlink RF carrier frequency respectively, transmission and reception at the uplink RF carrier frequency may be used as a first pair set and transmission and reception at the downlink RF carrier frequency may be used as a second pair set. Further, the transmission at the uplink RF carrier frequency and reception at the downlink RF carrier frequency may also be used as the first pair set and the reception at the uplink RF carrier frequency and transmission at the downlink RF carrier frequency may also be used as the second pair set.

Furthermore, a conventional FDD system is characterized in that the uplink RF carrier frequency and downlink RF carrier frequency are used separately and transmission and reception that use these respective RF carrier frequencies are performed simultaneously. However, in order to reduce the complexity of the analog wireless circuit, a method known as a hybrid FDD system which does not perform the simultaneous transmission and reception of the FDD system but which instead performs transmission and reception in different time slots has also been examined. So, in cases where this hybrid FDD system is used, transmission and reception can be performed simultaneously by using this embodiment.

In addition, in this embodiment, in which transmission and reception are performed simultaneously at the uplink RF carrier frequency and the downlink RF carrier frequency of the FDD system respectively, two RF carrier frequencies are used to perform simultaneous transmission and reception respectively. Therefore, in a case where three or more RF carrier frequencies are used, expansion to perform transmission and reception simultaneously at these respective frequencies can be performed in a straightforward manner.

Sixth Embodiment

Figure 22:
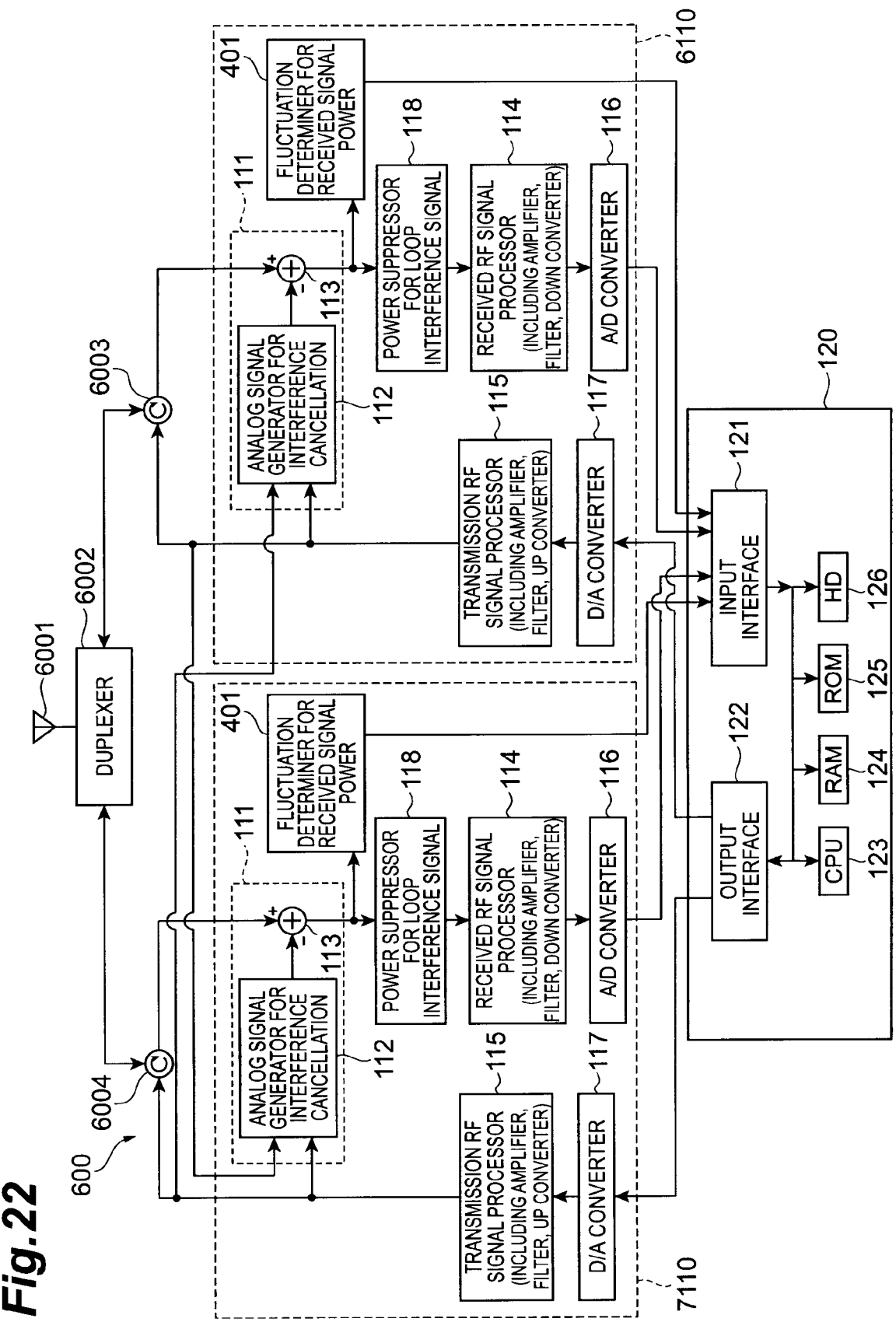
FIG. 22 is a hardware block diagram of a radio communication apparatus according to a sixth embodiment.

The structure of the radio communication apparatus of the sixth embodiment of the present invention will be described next. The hardware structure of the radio communication apparatus 600 of this embodiment is shown in FIG. 22. The radio communication apparatus of this embodiment is the radio communication apparatus of the fifth embodiment, characterized in that control is performed so that transmission and reception are not performed simultaneously in a situation where removal of the coupling loop interference signal is not adequate either for the downlink or for the uplink.

The hardware structure of the radio communication apparatus of this embodiment shown in FIG. 22 further comprises, in addition to the radio communication apparatus of the fifth embodiment shown in FIG. 16, a fluctuation determiner for received signal power 401 in the uplink analog signal processor and the downlink analog signal processor respectively. The fluctuation determiner for received signal power 401 in the uplink analog signal processor 6110 and the downlink analog signal processor 7110 respectively uses an output signal of the analog domain interference canceller 111 to determine the received power fluctuation speed and inputs the result to the digital signal processor 120. Here, a structure that uses the output signal of the analog domain interference canceller 111 as the signal that is input to the fluctuation determiner for received signal power 401 was described above. However, it is also possible to use the input signal that is input to the analog domain interference canceller 111 via the circulator, the output signal of the power suppressor for coupling loop interference signal 118, and the output signal of the received RF signal processor 114.

Figure 23:
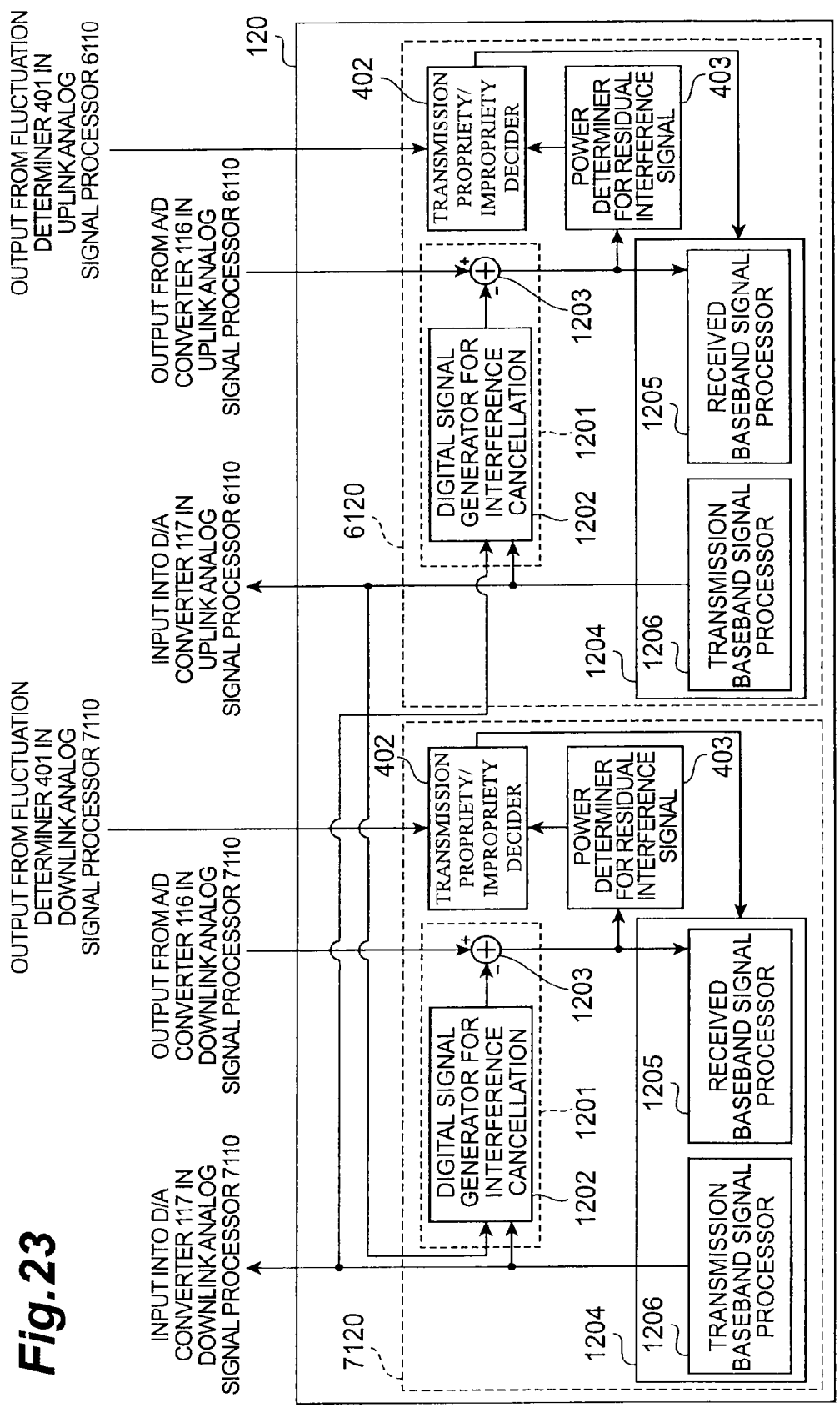
FIG. 23 is a functional block diagram of a digital signal processor according to the sixth embodiment.

The functional block diagram of the digital signal processor 120 of this embodiment will be shown in FIG. 23. In addition to the functional block of the digital signal processor of the fifth embodiment shown in FIG. 17, the uplink digital signal processor 6120 and the downlink digital signal processor 7120 are characterized by comprising, a power determiner for residual interference signal 403 and a transmission propriety/impropriety decider 402.

The power determiner for residual interference signal 403 in the uplink digital signal processor 6120 and the downlink digital signal processor 7120 respectively uses the output signal of the digital domain interference canceller 1201 to determine a ratio of the power of the residual interference signal in the output signal following digital domain interference removal. The ratio of the power of the residual interference signal determined by the power determiner for residual interference signal 403 is input to the transmission propriety/impropriety decider 402. The transmission propriety/impropriety decider 402 determines whether to perform signal transmission in superposed fashion on the received signal (in other words, whether signal transmission by the transmission baseband signal processor 1206 is to be performed or not), on the basis of whether the received power fluctuation speed determined by the fluctuation determiner for received signal power 401 is equal to or more than a predetermined reference value and whether the ratio of the power of the residual interference signal determined by the power determiner for residual interference signal 403 is equal to or more than a predetermined reference ratio, and inputs the result to the baseband signal processor 1204.

In other words, the transmission propriety/impropriety decider 402 of the uplink digital signal processor 6120 uses the output from the fluctuation determiner for received signal power 401 of the uplink analog signal processor 6110 and the output of the power determiner for residual interference signal 403 in the uplink digital signal processor 6120 to determine whether to perform transmission and reception simultaneously at the uplink RF carrier frequency (in other words, whether to perform signal transmission in superposed fashion on the received signal). Likewise, the transmission propriety/impropriety decider 402 in the downlink digital signal processor 7120 uses the output from the fluctuation determiner for received signal power 401 in the downlink analog signal processor 7110 and the output of the power determiner for residual interference signal 403 in the downlink digital signal processor 7120 to determine whether to perform simultaneous transmission and reception of the signal at the downlink RF carrier frequency (that is, whether to perform signal transmission in superposed fashion on the received signal).

Figure 24:
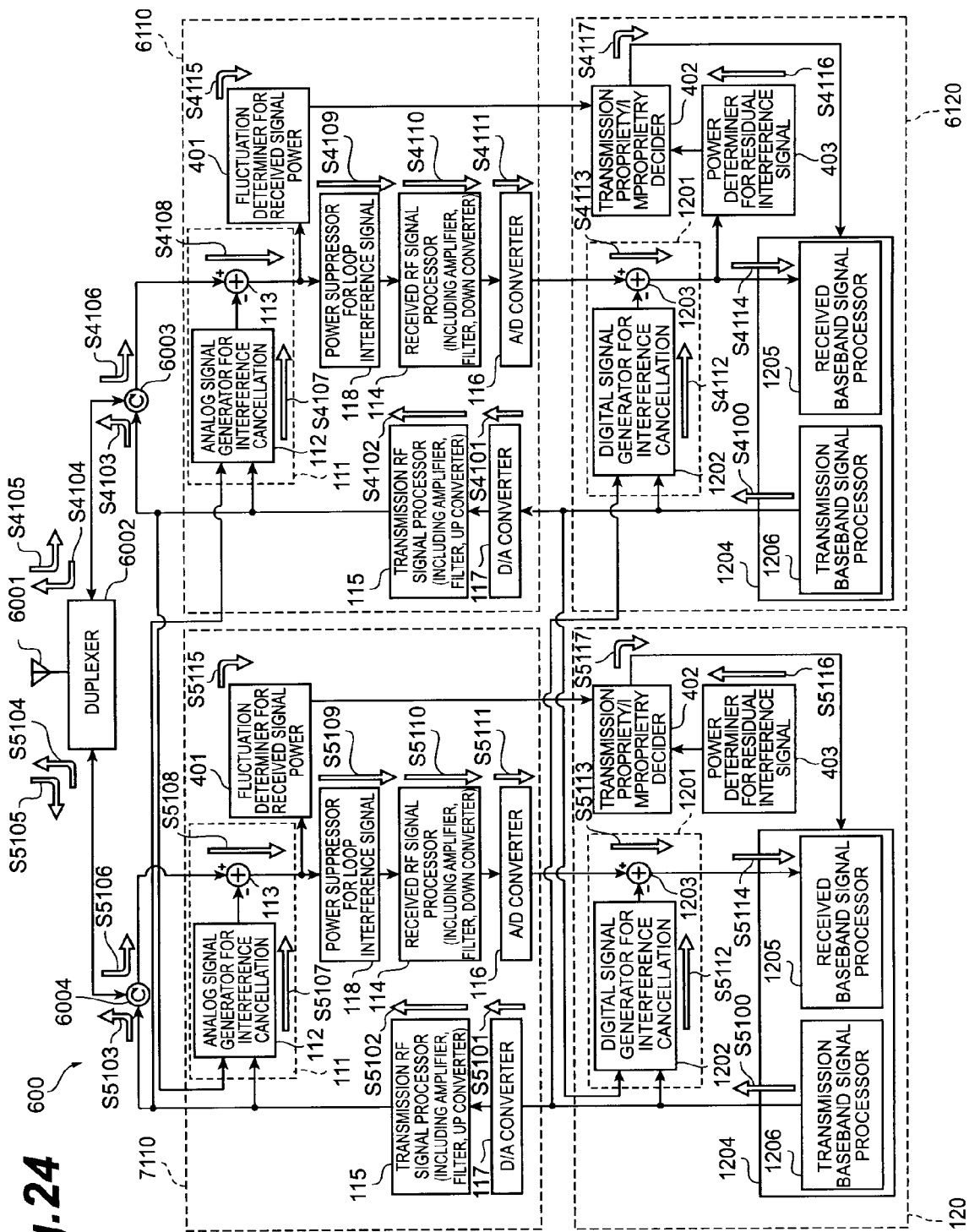
FIG. 24 is a block diagram of a procedure of a radio communication apparatus according to the sixth embodiment.

The operation of the radio communication apparatus of this embodiment will be described next together with the radio communication method of the embodiment of the present invention. FIG. 24 shows the procedure with which the radio communication apparatus according to this embodiment performs transmission and reception.

According to this embodiment, in addition to the procedure of the fifth embodiment shown in FIG. 18, this radio communication method further comprises steps S4115 and S5115 that determine the received power fluctuation speed by using the analog domain signal for the uplink/downlink respectively, steps S4116 and S5116 that determine the power of the residual interference signal that remains from the output signal following digital domain interference removal and determine the power ratio of the residual interference signal in the output signal following the digital domain interference removal, and transmission permission/non-permission determination steps S4117 and S5117 that use both outputs to determine whether to perform signal transmission in superposed fashion on the received signal.

In steps S4117 and S5117 of the above steps, the transmission propriety/impropriety decider 402 determines whether the received power fluctuation speed determined by steps S4115 and S5115 is equal to or more than a predetermined reference value and determines whether the power ratio of the residual interference signal determined by steps S4116 and S5116 is equal to or more than a predetermined reference value. Here, in cases where the received power fluctuation speed is equal to or more than a predetermined reference value or where the power ratio of the residual interference signal is equal to or more than a predetermined reference ratio, the transmission propriety/impropriety decider 402 determines that the transmission from the transmission baseband signal processor 1206 is not permitted (in other words, signal transmission in superposed fashion on the received signal is not performed). However, in cases where the received power fluctuation speed is less than the predetermined reference value and the power ratio of the residual interference signal is less than the predetermined reference ratio, the transmission propriety/impropriety decider 402 determines that transmission from the transmission baseband signal processor 1206 is permitted (in other words, signal transmission in superposed fashion on the received signal is performed).

Information determined in steps S4117 and S5117 is input to the baseband signal processor 1204 and, when transmission is permitted, transmission of the signals of steps S4100 and S5100 is performed by the transmission baseband signal processor 1206. When transmission is not permitted, the transmission of the signals in steps S4100 and S5100 performed by the transmission baseband signal processor 1206 is not performed.

In steps S4115 and S5115 above, the fluctuation speed of the received power may be determined by using a signal that has undergone analog domain interference removal or the fluctuation speed of the received power may be determined by using the signal prior to analog domain interference removal.

The effect and action of the radio communication apparatus and radio communication method according to this embodiment will be described next. After reducing the effect of the coupling loop interference signal, an adequate interference removal characteristic cannot be expected in cases where the fluctuation speed of the received power is high from the perspective of the compliance of the interference removal function of the coupling loop interference canceller. Further, when signal transmission in superposed fashion on the received signal is executed in cases where a large number of interference signal components remain even after interference removal in the digital domain, the detection performance of the received signal deteriorates and there is a possibility that this will conversely be the cause of a reduction of the frequency utilization efficiency.

Therefore, the radio communication apparatus and radio communication method of this embodiment are able to improve the frequency utilization efficiency by simultaneously performing signal transmission and reception in a state where coupling loop interference signal removal is performed adequately for the uplink/downlink respectively and, at the same time, it is possible to implement a radio communication apparatus and radio communication method which simultaneously perform signal transmission and reception corresponding to a state for the uplink/downlink RF carrier frequency where there is no need for adequate separation of the uplink RF carrier frequency and downlink RF carrier frequency in order to alleviate the effect of the coupling loop interference signal that arises in cases where the uplink RF carrier frequency and downlink RF carrier frequency are adjacent to one another.

The disclosure of Japanese Patent Application No. 2006-148899 filed May 29, 2006 including specification, drawings and claims is incorporated herein by reference in its entirety.

What is claimed is:

1. A radio communication apparatus for performing transmission and reception of radio communications simultaneously by using different carrier frequencies for transmission and reception, the radio communication apparatus comprising:

a transceiver comprising a coupling loop interference signal removal function for an analog domain and a coupling loop interference signal removal function for a digital domain, for removing a coupling loop interference signal contained in a signal;

a power suppressor that couples loop interference signal for attenuating signal power of a signal generated following the analog domain coupling loop interference signal removal in order to suppress coupling loop interference signal power, wherein the power suppressor for coupling loop interference signal attenuates the signal power prior to the digital domain coupling loop interference signal removal in the transceiver;

an uplink analog signal processor that performs predetermined processing on a signal of the uplink analog domain, the uplink analog signal processor comprising a first fluctuation determiner for received signal power for determining received power fluctuation speed by using the output signal after uplink analog domain interference removal;

a downlink analog signal processor that performs predetermined processing on a signal of the downlink analog domain, the downlink analog signal processor comprising a second fluctuation determiner for received signal power for determining received power fluctuation speed by using the output signal after the downlink analog domain interference removal;

an uplink digital signal processor that performs predetermined processing on the signal of the uplink digital domain, the uplink digital signal processor comprising, a first power determiner for residual interference signal for determining a ratio of the residual interference signal power in the output signal power after uplink digital domain interference removal, and a first transmission propriety/impropriety decider for determining whether to perform simultaneous transmission and reception of signals at a predetermined uplink carrier frequency, on the basis of at least one of whether the received power fluctuation speed determined by the first fluctuation determiner for received signal power is equal to or more than a predetermined reference value and whether the ratio of the residual interference signal power determined by the first power determiner for residual interference signal is equal to or more than a predetermined reference ratio;

a downlink digital signal processor that performs predetermined processing on the signal of the downlink digital domain, the downlink digital signal processor comprising, a second power determiner for residual interference signal for determining a ratio of the residual interference signal power in the output signal power after downlink digital domain interference removal; and a second transmission propriety/impropriety decider for determining whether to perform simultaneous transmission and reception of signals at a predetermined downlink carrier frequency, on the basis of at least one of whether the received power fluctuation speed determined by the second fluctuation determiner for received signal power is equal to or more than a predetermined reference value and whether the ratio of the residual interference signal power determined by the second power determiner for residual interference signal is equal to or more than a predetermined reference ratio, wherein the radio communication apparatus is configured to use a predetermined uplink carrier frequency to perform transmission and reception simultaneously by means of the uplink digital signal processor and the uplink analog signal processor, and is configured to use a predetermined downlink carrier frequency to perform transmission and reception simultaneously by means of the downlink digital signal processor and the downlink analog signal processor, and wherein the radio communication apparatus is configured to control the simultaneous transmission and reception of signals at a predetermined uplink carrier frequency on the basis of the determination by the first transmission propriety/impropriety decider, and is configured to control the simultaneous transmission and reception of signals at a predetermined downlink carrier frequency on the basis of the determination by the second transmission propriety/impropriety decider.

2. The radio communication apparatus according to claim 1, wherein the transceiver further comprises a transmission RF signal processor, a received RF signal processor, and a baseband signal processor, the radio communication apparatus further comprises a controller for power suppression for controlling at least one of magnitude of the signal power attenuated by the power suppressor for coupling loop interference signal, magnitude of the output power of the transmission RF signal processor, magnitude of the output power of the received RF signal processor, and magnitude of the output of the baseband signal processor, and the controller for power suppression is configured to perform the control in response to at least one of the magnitude of the output power of the transmission RF signal processor, the magnitude of the output power of the received RF signal processor, and the magnitude of the output of the baseband signal processor.

3. The radio communication apparatus according to claim 1, wherein the radio communication apparatus separately comprises a transmission antenna and a reception antenna.

4. The radio communication apparatus according to claim 1, wherein the transceiver separately comprises an uplink signal processor that performs predetermined processing on an uplink signal and a downlink signal processor that performs predetermined processing on a downlink signal, the radio communication apparatus separately comprises an antenna for communication with base stations and an antenna for communication with mobile stations, and the radio communication apparatus is configured to perform predetermined processing, by means of the downlink signal processor, on the signal from the base station received by the antenna for communication with base stations and to transmit the processed signal from the antenna for communication with mobile stations, and is configured to perform predetermined processing, by means of the uplink signal processor, on the signal from the mobile station received by the antenna for communication with mobile stations and to transmit the processed signal from the antenna for communication with base stations.

5. A radio communication method for a radio communication apparatus for performing transmission and reception of radio communications simultaneously by using different carrier frequencies for transmission and reception, the method comprising:

performing a coupling loop interference signal removal processing for an analog domain and a coupling loop interference signal removal processing for a digital domain, to remove a coupling loop interference signal contained in a signal;

a power suppression step of attenuating signal power of a signal generated following the analog domain coupling loop interference signal removal processing to suppress coupling loop interference signal power;

an uplink analog signal processing step of performing predetermined processing on a signal of the uplink analog domain, the uplink analog signal processing step including determining received power fluctuation speed by using the output signal after uplink analog domain interference removal;

a downlink analog signal processing step of performing predetermined processing on a signal of the downlink analog domain, the downlink analog signal processing step including determining received power fluctuation speed by using the output signal after downlink analog domain interference removal;

an uplink digital signal processing step of performing predetermined processing on the signal of the uplink digital domain, the uplink digital signal processing step including determining received power fluctuation speed by using the output signal after uplink analog domain interference removal, determining a ratio of the residual interference signal power in the output signal power after uplink digital domain interference removal, and determining whether to perform simultaneous transmission and reception of signals at a predetermined uplink carrier frequency, on the basis of at least one of whether the received power fluctuation speed is equal to or more than a predetermined reference value and whether the ratio of the residual interference signal power is equal to or more than a predetermined reference ratio; and a downlink digital signal processing step of performing predetermined processing on the signal of the downlink digital domain, the downlink digital signal processing step including determining a ratio of the residual interference signal power in the output signal power after downlink digital domain interference removal, and determining whether to perform simultaneous transmission and reception of signals at a predetermined downlink carrier frequency, on the basis of at least one of whether the received power fluctuation speed is equal to or more than a predetermined reference value and whether the ratio of the residual interference signal power is equal to or more than a predetermined reference ratio, wherein the power suppression step, is performed prior to the digital domain coupling loop interference signal removal processing, the radio communication apparatus uses a predetermined uplink carrier frequency to perform transmission and reception simultaneously in the uplink digital signal processing step and the uplink analog signal processing step, and the radio communication apparatus uses a predetermined downlink carrier frequency to perform transmission and reception simultaneously in the downlink digital signal processing step and the downlink analog signal processing step, and the radio communication apparatus controls the simultaneous transmission and reception of signals at a predetermined uplink carrier frequency on the basis of the determination in the uplink digital signal processing step, and controls the simultaneous transmission and reception of signals at a predetermined downlink carrier frequency on the basis of the determination in the downlink digital signal processing step.

6. The radio communication method according to claim 5, further comprising a control step of performing control on at least one of magnitude of the signal power attenuated in the power suppression step, magnitude of the output power by transmission RF signal processing, magnitude of the output power by received RF signal processing, and magnitude of the output by baseband signal processing, wherein the control step is performed in response to at least one of the magnitude of the output power by the transmission RF signal processing, the magnitude of the output power by the received RF signal processing, and the magnitude of the output by the baseband signal processing.

* * * * *